United States Patent
Luo et al.

(10) Patent No.: US 9,232,462 B2
(45) Date of Patent: Jan. 5, 2016

(54) METHODS AND APPARATUS FOR CROSS-CELL COORDINATION AND SIGNALING

(75) Inventors: Tao Luo, San Diego, CA (US); Xiaoxia Zhang, San Diego, CA (US); Kibeom Seong, West New York, NJ (US); Ke Liu, San Diego, CA (US); Taesang Yoo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 747 days.

(21) Appl. No.: 12/904,952

(22) Filed: Oct. 14, 2010

(65) Prior Publication Data

US 2011/0255486 A1 Oct. 20, 2011

Related U.S. Application Data

(60) Provisional application No. 61/252,125, filed on Oct. 15, 2009.

(51) Int. Cl.
*H04W 4/00* (2009.01)
*H04W 48/12* (2009.01)
(Continued)

(52) U.S. Cl.
CPC ............ *H04W 48/12* (2013.01); *H04W 72/082* (2013.01); *H04W 16/14* (2013.01); *H04W 72/0406* (2013.01); *H04W 72/0426* (2013.01); (Continued)

(58) Field of Classification Search
CPC ..................................................... H04W 28/04
USPC ......... 370/329, 330, 331, 332, 338, 337, 339, 370/328; 455/517, 219, 225, 551, 560; 709/208, 209, 211, 228, 227
See application file for complete search history.

(56) References Cited

U.S. PATENT DOCUMENTS 5,920,818 A * 7/1999 Frodigh et al. ................ 455/443
8,615,266 B2 * 12/2013 Bonneville et al. ........... 455/522
(Continued)

FOREIGN PATENT DOCUMENTS

EP 1435747 A1 7/2004
WO 2009024614 A2 2/2009
(Continued)

OTHER PUBLICATIONS

3GPP, "3rd Generation Partnership Project, Technical Specification Group Radio Access Networks, LTE FDD Home eNodeB RF Requirements Work Item Technical Report (Release 9)", 3GPP Draft, R4-095019_TR 36.9XX V0.2.0, 3rd Generation Partnership Project (3GPP), Mobile Competence Centre, 650, Route Des Lucioles, F-06921 Sophia-Antipolis Cedex, France, No. Jeju, Nov. 9, 2009, Mar. 1, 2009, XP050394455, [retrieved on Nov. 17, 2009].
(Continued)

*Primary Examiner* — Hassan Kizou
*Assistant Examiner* — Abdelnabi Musa

(57) ABSTRACT

Methods and apparatus for providing cross-cell signaling and/or coordination for interference mitigation in wireless communication networks are described. In one aspect, a UE associated with a serving eNB may receive control signaling from another non-serving eNB in a different cell. The control signaling may be consistent with a characteristic of the serving eNB and associated cell. In another aspect, multiple eNBs may coordinate transmission of DL resources to minimize collisions of control signaling resources.

49 Claims, 16 Drawing Sheets

(51) Int. Cl.
*H04W 72/08* (2009.01)
*H04W 16/14* (2009.01)
*H04W 72/04* (2009.01)
*H04W 72/12* (2009.01)
*H04W 84/04* (2009.01)

(52) U.S. Cl.
CPC ......... *H04W 72/1289* (2013.01); *H04W 84/045* (2013.01)

(56) References Cited

U.S. PATENT DOCUMENTS

| | | | |
|---|---|---|---|
| 8,825,046 B2 | 9/2014 | Borran et al. | |
| 2002/0061764 A1* | 5/2002 | Kim et al. | 455/522 |
| 2007/0243874 A1* | 10/2007 | Park et al. | 455/442 |
| 2009/0073933 A1 | 3/2009 | Madour et al. | |
| 2009/0197631 A1 | 8/2009 | Palanki et al. | |
| 2009/0247181 A1 | 10/2009 | Palanki et al. | |
| 2009/0252075 A1 | 10/2009 | Ji et al. | |
| 2009/0257390 A1 | 10/2009 | Ji et al. | |
| 2009/0275337 A1* | 11/2009 | Maeda et al. | 455/442 |
| 2010/0190447 A1 | 7/2010 | Agrawal et al. | |
| 2011/0080896 A1* | 4/2011 | Krishnamurthy et al. | 370/336 |
| 2012/0099458 A1* | 4/2012 | Ezaki et al. | 370/252 |

FOREIGN PATENT DOCUMENTS

| | | |
|---|---|---|
| WO | WO-2009035983 A1 | 3/2009 |
| WO | WO-2009099472 A2 | 8/2009 |
| WO | WO-2009099813 A1 | 8/2009 |

OTHER PUBLICATIONS

European Search Report—EP13160683—Search Authority—Munich—May 17, 2013.

International Search Report and Written Opinion—PCT/US2010/052957, International Search Authority—European Patent Office—Mar. 28, 2011.

LG Electronics, "CoMP Configurations and UE/eNB Behaviors in LTE-advanced", 3GPP Draft, R1-090782, 3rd Generation Partnership Project (3GPP), Mobile Competence Centre, 650, Route Des Lucioles, F-06921 Sophia-Antipolis Cedex, France, No. Athens, Greece, Feb. 3, 2009, XP050318640, [retrieved on Feb. 3, 2009].

Motorola: "Reducing HeNB interference to Macro eNB control channels", 3GPP Draft; R4-093091 HENB_CC_IM, 3rd Generation Partnership Project (3GPP), Mobile Competence Centre ; 650, Route Des Lucioles ; F-06921 Sophia-Antipolis Cedex ; France, No. Shenzhen, China; Aug. 18, 2009, XP050354195, [retrieved on Aug. 18, 2009].

Partial International Search Report—PCT/US2010/052957—International Search Authority, European Patent Office, Jan. 19, 2011.

Taiwan Search Report—TW099135285—TIPO—Apr. 19, 2014.

* cited by examiner

METHODS AND APPARATUS FOR CROSS-CELL COORDINATION AND SIGNALING

CROSS-REFERENCE TO RELATED APPLICATIONS

This application claims priority under 35 U.S.C. §119(e) to U.S. Provisional Patent Application Ser. No. 61/252,125 entitled METHOD AND APPARATUS FOR CROSS-CELL COORDINATION AND CROSS-CELL SIGNALING AND/OR DATA TRANSMISSION, filed on Oct. 15, 2009, the content of which is hereby incorporated by reference herein in its entirety for all purposes.

FIELD

This application is directed generally to wireless communications systems. More particularly, but not exclusively, the application relates to methods and apparatus for providing cross-cell signaling and/or coordination for interference mitigation in wireless communication networks.

BACKGROUND

Wireless communication systems are widely deployed to provide various types of communication content such as voice, data, video and the like, and deployments are likely to increase with introduction of new data oriented systems such as Long Term Evolution (LTE) systems. Wireless communications systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems and other orthogonal frequency division multiple access (OFDMA) systems.

Generally, a wireless multiple-access communication system can simultaneously support communication for multiple wireless terminals (also know as user equipments (UEs), or access terminals (ATs). Each terminal communicates with one or more base stations (also know as access points (APs), EnodeBs or eNBs) via transmissions on forward and reverse links. The forward link (also referred to as a downlink or DL) refers to the communication link from the base stations to the terminals, and the reverse link (also referred to as an uplink or UL) refers to the communication link from the terminals to the base stations. These communication links may be established via a single-in-single-out, single-in-multiple out, multiple-in-single-out or a multiple-in-multiple-out (MIMO) system.

Base station nodes, sometimes referred to as eNBs, may have different capabilities for deployment in a network. This includes transmission power classes, access restriction, and so forth. In one aspect, heterogeneous network characteristics create wireless coverage dead spots (e.g., Donut coverage hole). This may cause severe inter-cell interference requiring undesirable user equipment cell association. In general, heterogeneous network characteristics require deep penetration of physical channels, which may cause unwanted interference between nodes and equipment on the respective network.

As the number of mobile stations deployed increases, the need for proper bandwidth utilization becomes more important. Moreover, with the introduction of semiautonomous base stations for managing small cells, such as femtocells and picocells, in systems such as LTE, interference with existing base stations may become an increasing problem.

SUMMARY

This disclosure relates generally to wireless communications systems. For example, in one aspect, the disclosure relates to methods and apparatus for providing cross-cell signaling and/or coordination to facilitate interference mitigation in wireless communication networks.

In another aspect, the disclosure relates to a method for coordinated transmission between nodes in a wireless communication system. The method may include, for example, determining, between a first base station and a second base station, a downlink (DL) channel resource configuration for a DL channel including a control channel. The DL channel resource configuration may be determined to minimize interference between the second base station and a user equipment (UE) served by the first base station. The method may further include transmitting, from the second base station, control channel signals in accordance with the DL channel resource configuration.

The determining may include, for example, allocating a different number of symbols between the first base station and the second base station for control channel signaling. The DL channel resource configuration may relate to, for example, channel configuration determined on at least one of a resource element (RE) level, a REG level, and/or a control channel element (CCE) level. The DL channel resource configuration may, for example, be dynamically or semi-statically determined with respect to one or more subframes. Alternately or in addition, the DL channel resource configuration may be determined with respect to a subset of a radio frame.

The DL channel may further comprise, for example, a physical downlink shared channel (PDSCH). The DL channel may comprise, for example, one or more of a physical downlink control channel (PDCC), a physical control format indicator channel (PCFICH), a physical hybrid ARQ indicator (PHICH) channel.

The step of minimizing interference may include, for example, determining a DL channel resource configuration to set the percentage of collisions between one or more channels from the first base station and one or more channels from the second base station below a predetermined threshold. The collisions may be based on collision occurring within a control channel or channel such as a PCFICH, PHICH, and/or other channels. The one or more channels may include, for example, one or more of a PDCCH, a PCFICH, a PHICH, and a PDSCH.

In another aspect, the disclosure relates to a method for facilitating wireless communications. The method may include, for example, transmitting control information associated with a second network cell, from a first base station in a first network cell. The information may be transmitted to one or more UEs associated with the second network cell.

The method may further include, for example, receiving the control channel information from a second base station in the second network cell. Alternately, or in addition, the control channel information may be received from another network node, such as, for example, core network component or other network node.

The control channel information may relate to, for example, to a physical downlink control channel (PDCCH), a physical hybrid ARQ indicator channel (PHICH), a synchronization channel, and/or other control or data channels.

The determining may include, for example, identifying a set of downlink channel resources based on a characteristic associated with the second network cell, which may be determined by the control information received from the first base station. The characteristic may include one or more of a cell ID of the second network cell, a PCFICH configuration, and a PHICH configuration. The control information may include one or more of control signaling, paging information, and system information broadcast (SIB) information.

The transmitting may include, for example, sending the information on a downlink channel. The downlink channel may include one or more of a PCFICH, PDCCH and PHICH consistent with downlink channel information associated with the second network cell.

In another aspect, the disclosure relates to a method of wireless communication. The method may include, for example, receiving signal transmissions from a serving base station in a first cell. The method may further include receiving information transmitted from a non-serving base station in a second cell in accordance with downlink channel resources associated with the first network cell.

The downlink channel resources may be determined, for example, based upon a characteristic associated with the first network cell. The characteristics may include, for example, one or more of a cell ID of the first network cell, a PCFICH configuration, and a PHICH configuration. The information may include, for example, one or more of control signaling, paging information, and SIB information.

The step of receiving the information may include, for example, receiving the information on a downlink channel. The downlink channel may include one or more of a PCFICH, PDCCH, and PHICH. The information may include, for example, at least one of paging or SIB information associated with the first network cell. The step of receiving the information may include, for example, receiving the information on a PDSCH.

The information may further include, for example, SIB information associated with the second network cell. The SIB information associated with the first network cell may be concatenated to the SIB information associated with the second network cell.

In another aspect, the disclosure relates to computer readable media including computer codes for causing a computer to perform the above-described methods.

In another aspect, the disclosure relates to communication devices configured to perform the above-described methods.

In another aspect, the disclosure relates to communication devices including means for performing the above-described methods.

Additional aspects, features, and functionality are further described below in conjunction with the appended drawings.

BRIEF DESCRIPTION OF THE DRAWINGS

The present application may be more fully appreciated in connection with the following detailed description taken in conjunction with the accompanying drawings, wherein.

DETAILED DESCRIPTION

Figure 1:
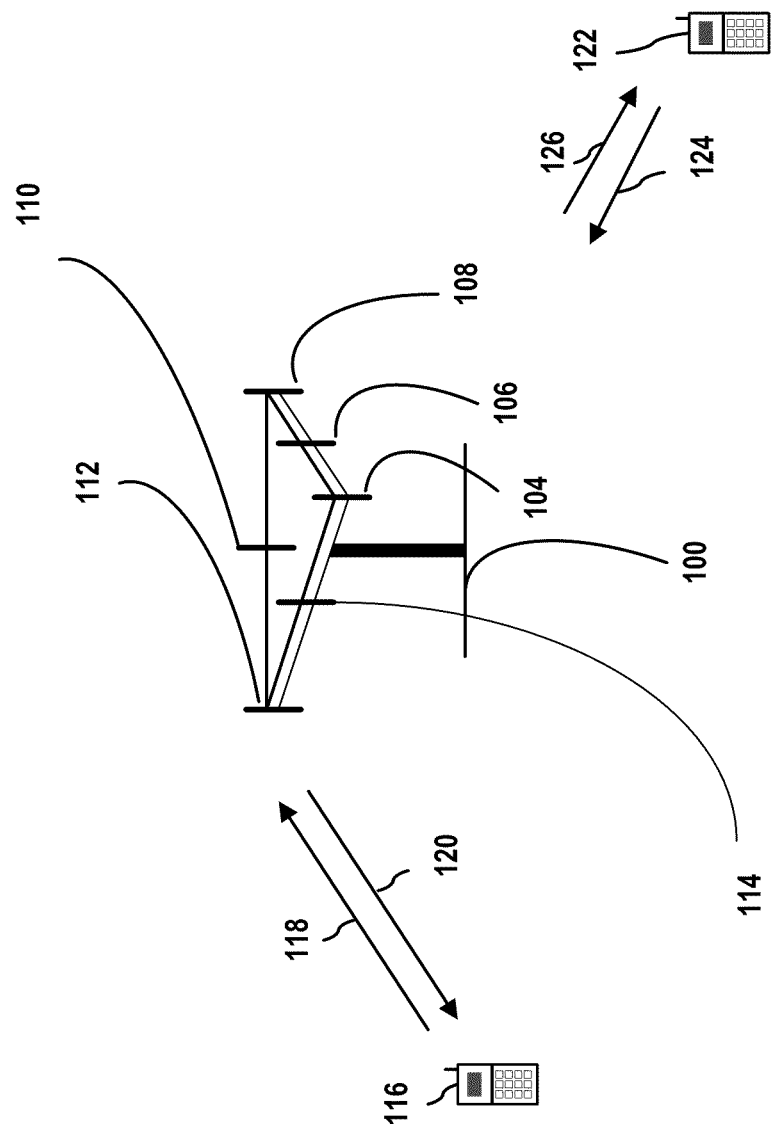
FIG. 1 illustrates details of a wireless communications system.

This disclosure relates generally to interference coordination, management, and mitigation in wireless communications systems. In various embodiments, the techniques and apparatus described herein may be used for wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, LTE networks, as well as other communications networks. As described herein, the terms "networks" and "systems" may be used interchangeably.

A CDMA network may implement a radio technology such as Universal Terrestrial Radio Access (UTRA), cdma2000 and the like. UTRA includes Wideband-CDMA (W-CDMA) and Low Chip Rate (LCR). Cdma2000 covers IS-2000, IS-95 and IS-856 standards. A TDMA network may implement a radio technology such as Global System for Mobile Communications (GSM).

An OFDMA network may implement a radio technology such as Evolved UTRA (E-UTRA), IEEE 802.11, IEEE 802.16, IEEE 802.20, Flash-OFDM and the like. UTRA, E-UTRA, and GSM are part of Universal Mobile Telecommunication System (UMTS). In particular, Long Term Evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed in the art. For example, the 3rd Generation Partnership Project (3GPP) is a collaboration between groups of telecommunications associations that aims to define a globally applicable third generation (3G) mobile phone specification. 3GPP Long Term Evolution (LTE) is a 3GPP project aimed at improving the Universal Mobile Telecommunications System (UMTS) mobile phone standard. The 3GPP may define specifications for the next generation of mobile networks, mobile systems, and mobile devices. For clarity, certain aspects of the apparatus and techniques are described below for LTE implementations, and LTE terminology is used in much of the description below; however, the description is not intended to be limited to LTE applications. Accordingly, it will be apparent to one of skill in the art that the apparatus and methods described herein may be applied to various other communications systems and applications.

Logical channels in wireless communications systems may be classified into Control Channels and Traffic Channels. Logical Control Channels may include a Broadcast Control Channel (BCCH) which is a downlink (DL) channel for broadcasting system control information, a Paging Control Channel (PCCH) which is a DL channel that transfers paging information and a Multicast Control Channel (MCCH) which is a point-to-multipoint DL channel used for transmitting Multimedia Broadcast and Multicast Service (MBMS) scheduling and control information for one or several MTCHs. Generally, after establishing a Radio Resource Control (RRC) connection this channel is only used by UEs that receive MBMS. A Dedicated Control Channel (DCCH) is a point-to-point bi-directional channel that transmits dedicated control information and is used by UEs having an RRC connection.

Logical Traffic Channels may include a Dedicated Traffic Channel (DTCH) which is point-to-point bi-directional channel, dedicated to one UE, for the transfer of user information, and a Multicast Traffic Channel (MTCH) for Point-to-multipoint DL channel for transmitting traffic data.

Transport Channels may be classified into downlink (DL) and uplink (UL) Transport Channels. DL Transport Channels may include a Broadcast Channel (BCH), Downlink Shared Data Channel (DL-SDCH) and a Paging Channel (PCH). The PCH may be used for support of UE power saving (when a DRX cycle is indicated by the network to the UE), broadcast over an entire cell and mapped to Physical Layer (PHY) resources which can be used for other control/traffic channels. The UL Transport Channels may include a Random Access Channel (RACH), a Request Channel (REQCH), an Uplink Shared Data Channel (UL-SDCH) and a plurality of PHY channels. The PHY channels may include a set of DL channels and UL channels.

In addition, the DL PHY channels may include the following:
Common Pilot Channel (CPICH)
Synchronization Channel (SCH)
Common Control Channel (CCCH)
Shared DL Control Channel (SDCCH)
Multicast Control Channel (MCCH)
Shared UL Assignment Channel (SUACH)
Acknowledgement Channel (ACKCH)
DL Physical Shared Data Channel (DL-PSDCH)
UL Power Control Channel (UPCCH)
Paging Indicator Channel (PICH)
Load Indicator Channel (LICH)
 The UL PHY Channels may include the following:
Physical Random Access Channel (PRACH)
Channel Quality Indicator Channel (CQICH)
Acknowledgement Channel (ACKCH)
Antenna Subset Indicator Channel (ASICH)
Shared Request Channel (SREQCH)
UL Physical Shared Data Channel (UL-PSDCH)
Broadband Pilot Channel (BPICH)

The word "exemplary" is used herein to mean "serving as an example, instance, or illustration." Any aspect and/or embodiment described herein as "exemplary" is not necessarily to be construed as preferred or advantageous over other aspects and/or embodiments.

For purposes of explanation of various aspects and/or embodiments, the following terminology and abbreviations may be used herein:
AM Acknowledged Mode
AMD Acknowledged Mode Data
ARQ Automatic Repeat Request
BCCH Broadcast Control CHannel
BCH Broadcast CHannel
C- Control-
CCCH Common Control CHannel
CCH Control CHannel
CCTrCH Coded Composite Transport Channel
CP Cyclic Prefix
CRC Cyclic Redundancy Check
CTCH Common Traffic CHannel
DCCH Dedicated Control CHannel
DCH Dedicated CHannel
DL DownLink
DSCH Downlink Shared CHannel
DTCH Dedicated Traffic CHannel
FACH Forward link Access CHannel
FDD Frequency Division Duplex
L1 Layer 1 (physical layer)
L2 Layer 2 (data link layer)
L3 Layer 3 (network layer)
LI Length Indicator
LSB Least Significant Bit
MAC Medium Access Control
MBMS Multmedia Broadcast Multicast Service
MCCH MBMS point-to-multipoint Control CHannel
MRW Move Receiving Window
MSB Most Significant Bit
MSCH MBMS point-to-multipoint Scheduling CHannel
MTCH MBMS point-to-multipoint Traffic CHannel
PCCH Paging Control CHannel
PCH Paging CHannel
PDU Protocol Data Unit
PHY PHYsical layer
PhyCH Physical CHannels
RACH Random Access CHannel
RLC Radio Link Control
RRC Radio Resource Control
SAP Service Access Point
SDU Service Data Unit
SHCCH SHared channel Control CHannel
SN Sequence Number
SUFI SUper FIeld
TCH Traffic CHannel
TDD Time Division Duplex
TFI Transport Format Indicator
TM Transparent Mode
TMD Transparent Mode Data
TTI Transmission Time Interval
U- User-
UE User Equipment
UL UpLink
UM Unacknowledged Mode
UMD Unacknowledged Mode Data
UMTS Universal Mobile Telecommunications System
UTRA UMTS Terrestrial Radio Access UTRAN UMTS Terrestrial Radio Access Network
MBSFN Multicast broadcast single frequency network
MCE MBMS coordinating entity
MCH Multicast channel
DL-SCH Downlink shared channel
MSCH MBMS control channel
PDCCH Physical downlink control channel
PDSCH Physical downlink shared channel LTE systems support time division duplex (TDD) and frequency division duplex (FDD) implementations. In a TDD system, the forward and reverse link transmissions use the same frequency regions so that the reciprocity principle allows the estimation of the forward link channel from the reverse link channel. This enables the access point to extract transmit beamforming gain on the forward link when multiple antennas are available at the access point.

System designs may support various time-frequency reference signals for the downlink and uplink to facilitate beamforming and other functions. A reference signal is a signal generated based on known data and may also be referred to as a pilot, preamble, training signal, sounding signal and the like. A reference signal may be used by a receiver for various purposes such as channel estimation, coherent demodulation, channel quality measurement, signal strength measurement, and the like. MIMO systems using multiple antennas generally provide for coordination of sending of reference signals between antennas, however, LTE systems do not in general provide for coordination of sending of reference signals from multiple base stations or eNBs.

3GPP Specification 36211-900 defines in Section 5.5 particular reference signals for demodulation, associated with transmission of PUSCH or PUCCH, as well as sounding, which is not associated with transmission of PUSCH or PUCCH. For example, Table 1 lists some reference signals for LTE implementations that may be transmitted on the downlink and uplink and provides a short description for each reference signal. A cell-specific reference signal may also be referred to as a common pilot, a broadband pilot and the like. A UE-specific reference signal may also be referred to as a dedicated reference signal.

TABLE 1

| Link | Reference Signal | Description |
| --- | --- | --- |
| Downlink | Cell Specific Reference Signal | Reference signal sent by a Node B and used by the UEs for channel estimation and channel quality measurement. |
| Downlink | UE Specific Reference Signal | Reference signal sent by a Node B to a specific UE and used for demodulation of a downlink transmission from the Node B. |
| Uplink | Sounding Reference Signal | Reference signal sent by a UE and used by a Node B for channel estimation and channel quality measurement. |
| Uplink | Demodulation Reference Signal | Reference signal sent by a UE and used by a Node B for demodulation of an uplink transmission from the UE. |

In some implementations a system may utilize time division duplexing (TDD). For TDD, the downlink and uplink share the same frequency spectrum or channel, and downlink and uplink transmissions are sent on the same frequency spectrum. The downlink channel response may thus be correlated with the uplink channel response. A reciprocity principle may allow a downlink channel to be estimated based on transmissions sent via the uplink. These uplink transmissions may be reference signals or uplink control channels (which may be used as reference symbols after demodulation). The uplink transmissions may allow for estimation of a space-selective channel via multiple antennas.

In LTE implementations orthogonal frequency division multiplexing is used for the downlink—that is, from a base station, access point or eNodeB (eNB) to a terminal or UE. Use of OFDM meets the LTE requirement for spectrum flexibility and enables cost-efficient solutions for very wide carriers with high peak rates, and is a well-established technology, for example OFDM is used in standards such as IEEE 802.11a/g, 802.16, HIPERLAN-2, DVB and DAB.

Time frequency physical resource blocks (also denoted here in as resource blocks or "RBs" for brevity) may be defined in OFDM systems as groups of transport carriers (e.g. sub-carriers) or intervals that are assigned to transport data. The RBs are defined over a time and frequency period. Resource blocks are comprised of time-frequency resource elements (also denoted here in as resource elements or "REs" for brevity), which may be defined by indices of time and frequency in a slot. Additional details of LTE RBs and REs are described in 3GPP TS 36.211.

UMTS LTE supports scalable carrier bandwidths from 20 MHz down to 1.4 MHZ. In LTE, an RB is defined as 12 sub-carriers when the sub-carrier bandwidth is 15 kHz, or 24 sub-carriers when the sub-carrier bandwidth is 7.5 kHz. In an exemplary implementation, in the time domain there is a defined radio frame that is 10 ms long and consists of 10 subframes of 1 millisecond (ms) each. Every sub frame consists of 2 slots, where each slot is 0.5 ms. The subcarrier spacing in the frequency domain in this case is 15 kHz. Twelve of these subcarriers together (per slot) constitutes an RB, so in this implementation one resource block is 180 kHz. 6 Resource blocks fit in a carrier of 1.4 MHz and 100 resource blocks fit in a carrier of 20 MHz.

In the downlink there are typically a number of physical channels as described above. In particular, the physical downlink control channel (PDCCH) is used for sending control, the physical hybrid ARQ indicator channel (PHICH) for sending ACK/NACK, the physical control format indicator channel (PCFICH) for specifying the number of control symbols, the Physical Downlink Shared Channel (PDSCH) for data transmission, the Physical Multicast Channel (PMCH) for broadcast transmission using a Single Frequency Network (SFN), and the Physical Broadcast Channel (PBCH) for sending important system information within a cell. Supported modulation formats on the PDSCH in LTE are QPSK, 16QAM and 64QAM. Various modulation and coding schemes are defined for the various channels in the 3GPP specification.

In the uplink there are typically three physical channels. While the Physical Random Access Channel (PRACH) is only used for initial access and when the UE is not uplink synchronized, the data is sent on the Physical Uplink Shared Channel (PUSCH). If there is no data to be transmitted on the uplink for a UE, control information would be transmitted on the Physical Uplink Control Channel (PUCCH). Supported modulation formats on the uplink data channel are QPSK, 16QAM and 64QAM.

If virtual MIMO/spatial division multiple access (SDMA) is introduced the data rate in the uplink direction can be increased depending on the number of antennas at the base station. With this technology more than one mobile can reuse the same resources. For MIMO operation, a distinction is made between single user MIMO, for enhancing one user's data throughput, and multi user MIMO for enhancing the cell throughput.

In 3GPP LTE, a mobile station or device may be referred to as a "terminal," "user device," or "user equipment" (UE). A base station may be referred to as an evolved NodeB or eNB.

A semi-autonomous base station may be referred to as a home eNB or HeNB. An HeNB may thus be one example of an eNB. The HeNB and/or the coverage area of an HeNB may be referred to as a femtocell, an HeNB cell or a closed subscriber group (CSG) cell (where access is restricted).

Various other aspects and features of the disclosure are further described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

FIG. 1 illustrates details of an implementation of a multiple access wireless communication system, which may be an LTE system, on which aspects as further described subsequently may be implemented. An evolved NodeB (eNB) 100 (also know as an access point or AP) may include multiple antenna groups, one including 104 and 106, another including 108 and 110, and an additional including 112 and 114. In FIG. 1, only two antennas are shown for each antenna group, however, more or fewer antennas may be utilized for each antenna group. A user equipment (UE) 116 (also known as an access terminal or AT) is in communication with antennas 112 and 114, where antennas 112 and 114 transmit information to UE 116 over forward link (also known as a downlink) 120 and receive information from UE 116 over reverse link (also known as an uplink) 118. A second UE 122 is in communication with antennas 106 and 108, where antennas 106 and 108 transmit information to UE 122 over forward link 126 and receive information from access terminal 122 over reverse link 124.

In a frequency division duplex (FDD) system, communication links 118, 120, 124 and 126 may use different frequency for communication. For example, forward link 120 may use a different frequency then that used by reverse link 118. In a time division duplex (TDD) system, downlinks and uplinks may be shared.

Each group of antennas and/or the area in which they are designed to communicate is often referred to as a sector of the eNB. Antenna groups each are designed to communicate to UEs in a sector of the areas covered by eNB 100. In communication over forward links 120 and 126, the transmitting antennas of eNB 400 utilize beamforming in order to improve the signal-to-noise ratio of forward links for the different access terminals 116 and 124. Also, an eNB using beamforming to transmit to UEs scattered randomly through its coverage causes less interference to UEs in neighboring cells than an eNB transmitting through a single antenna to all its UEs. An eNB may be a fixed station used for communicating with the UEs and may also be referred to as an access point, a Node B, or some other equivalent terminology. A UE may also be called an access terminal, AT, user equipment, wireless communication device, terminal, or some other equivalent terminology.

Figure 2:
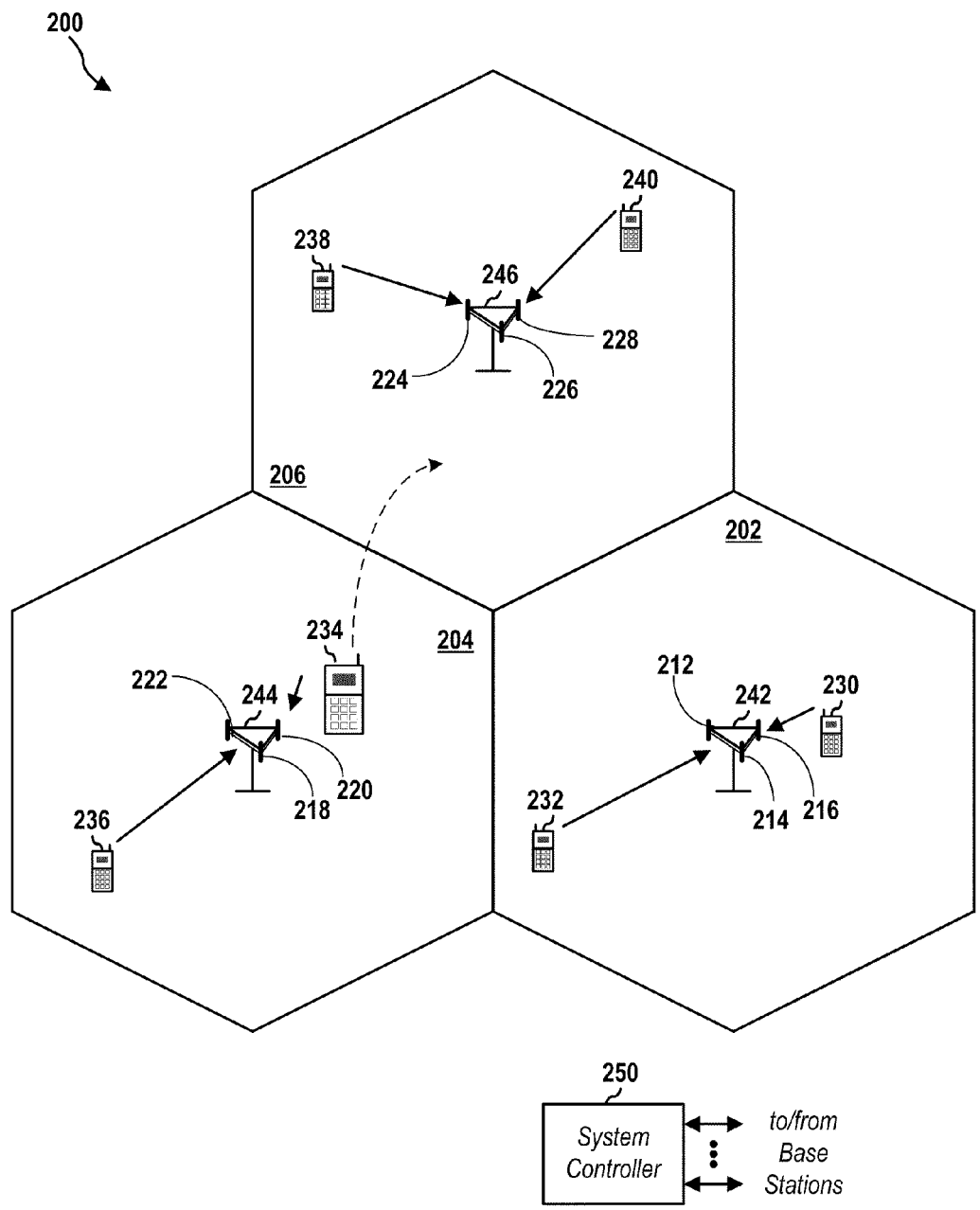
FIG. 2 illustrates details of a wireless communications system having multiple cells.

FIG. 2 illustrates details of an implementation of a multiple access wireless communication system 200, such as an LTE system, on which aspects, such as are described subsequently herein, may be implemented. The multiple access wireless communication system 200 includes multiple cells, including cells 202, 204, and 206. In one aspect the system 200, the cells 202, 204, and 206 may include an eNB that includes multiple sectors. The multiple sectors can be formed by groups of antennas with each antenna responsible for communication with UEs in a portion of the cell. For example, in cell 202, antenna groups 212, 214, and 216 may each correspond to a different sector. In cell 204, antenna groups 218, 220, and 222 each correspond to a different sector. In cell 206, antenna groups 224, 226, and 228 each correspond to a different sector. The cells 202, 204 and 206 can include several wireless communication devices, e.g., user equipment or UEs, which can be in communication with one or more sectors of each cell 202, 204 or 206. For example, UEs 230 and 232 can be in communication with eNB 242, UEs 234 and 236 can be in communication with eNB 244, and UEs 238 and 240 can be in communication with eNB 246. The cells and associated base stations may be coupled to a system controller 250, which may be part of a core or backhaul network or may provide connectivity to a core or backhaul, such as may be used to perform functions as further described herein related to inter-cell coordination and other aspects.

Figure 3:
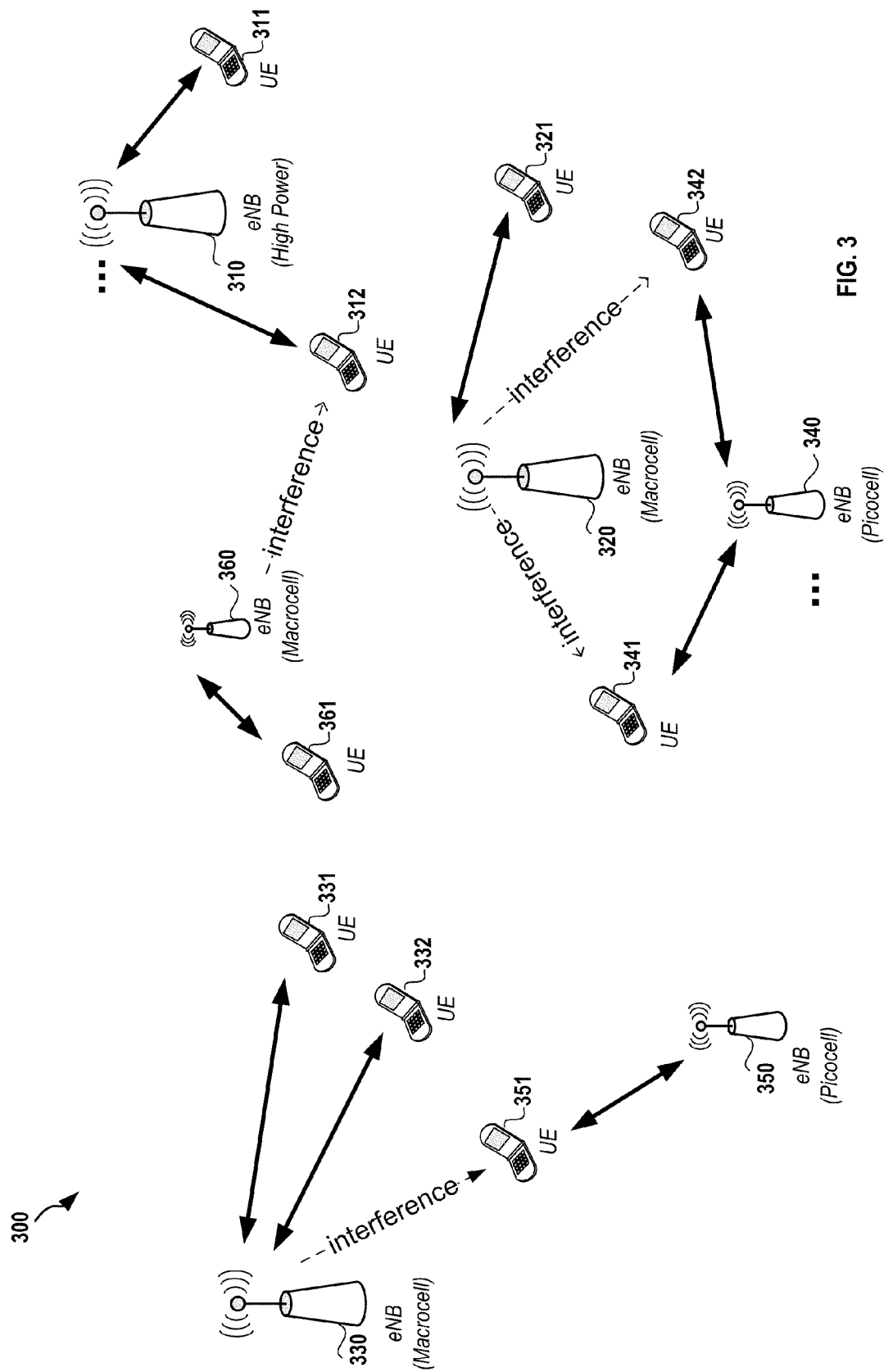
FIG. 3 illustrates details of a multi-cell wireless communications system having nodes of different types.

FIG. 3 illustrates details of an implementation of a multiple access wireless communication system 300, such as an LTE system. Various elements of system 300 may be implemented using components and configurations as shown in FIGS. 1 and 2. System 300 may be configured as a heterogeneous network (also known as a "hetnet") where various base stations or eNBs having different characteristics may be deployed. For example, eNBs of different types such as macrocell eNBs, picocell eNBs and femtocell eNBs may be deployed in proximity in a particular area or region, and may each be associated with different cells. In addition, eNBs of different power classes may also be deployed in various implementations. The eNBs shown in FIG. 3, along with their associated cells, may be configured to provide signaling and/or inter-cell coordination as described subsequently herein.

In the example shown, network 300 includes six eNBs 310, 320, 330, 340, 350, and 360. These eNBs may be of different types and/or power classes in various implementations. For example, in system 300, eNB 310 may be a high power eNB associated with a macrocell, eNB 320 may be another macrocell eNB that may operate in a different power class, eNB 330 may be another eNB operating in the same or a different power class, and eNBs 340 and 350 may be picocell eNBs. Other eNBs of other types and/or classes, such as femtocell nodes, etc. (not shown) may also be included. The coverage areas of these various nodes and associated cells may overlap, creating interference. For example, eNB 330 may be in communication with served UEs 331 and 332, and may further create interference for UE 351, which may be served by eNB 350.

Accordingly, inter-cell interference coordination between eNB 330 and eNB 350 may be useful to mitigate this interference. Likewise, UEs 341 and 342, which may be served by eNB 340, may be subject to interference from macrocell eNB 320, which may be serving UE 321. In these two examples, macrocell nodes may create interference with picocell nodes, however, in other cases, picocell nodes may create interference with macrocell nodes (and/or femtocell nodes), and in addition, macrocell nodes may create interference with each other. For example, macrocell eNB 360, which is serving UE 361, may create interference for UE 312, which is being served by eNB 310. eNB 310 may be a high power eNB, which may also be serving UE 311.

Cross-cell coordination and/or associated signaling between, for example, base stations or eNBs as shown in FIG.

Figure 4A:
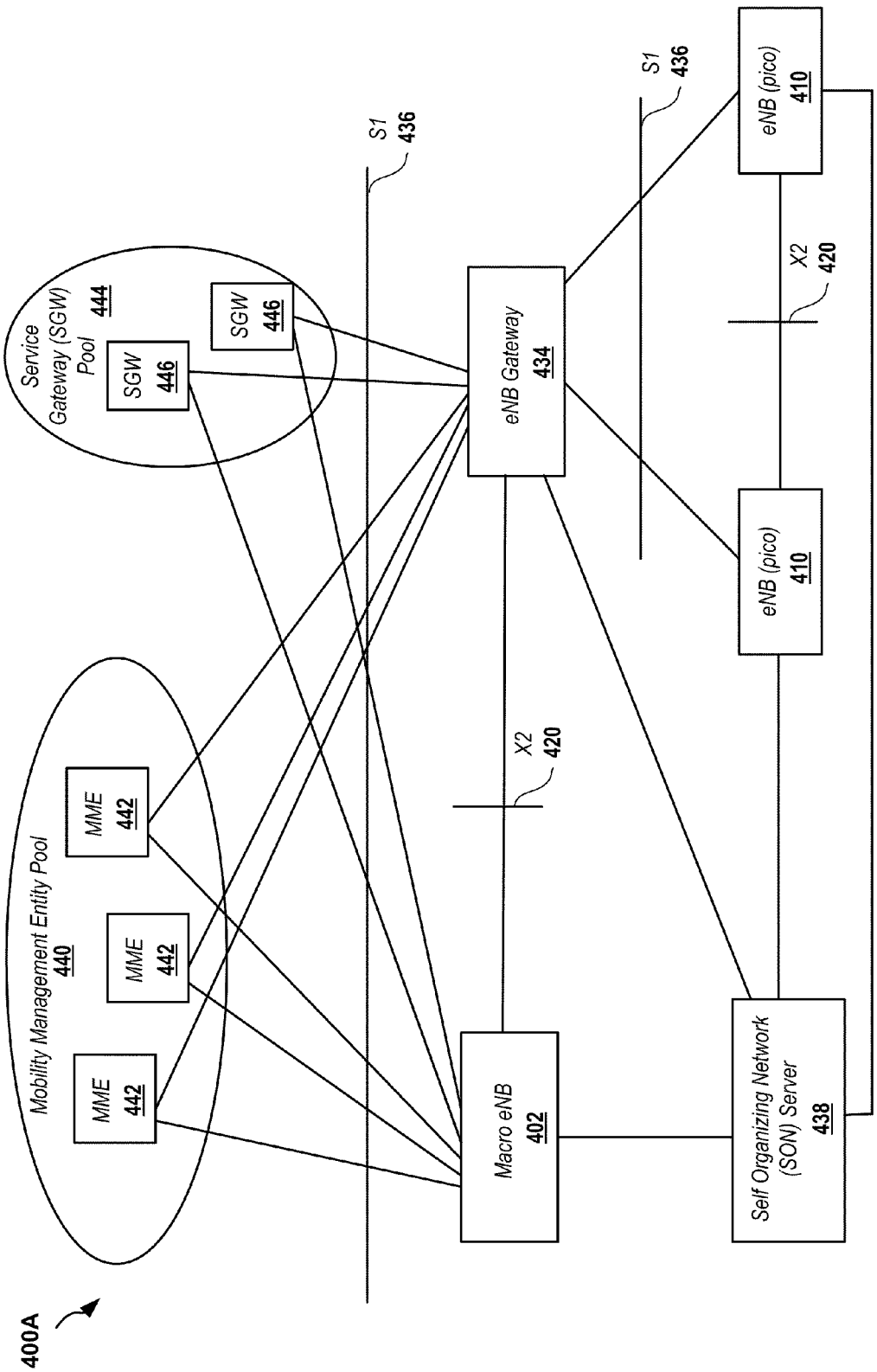
FIG. 4A illustrates details of base station to base station communication connections in a wireless communications system.

3, may be done in conjunction with a backhaul network and/or inter-eNB signaling. For example, FIG. 4A illustrates details of an example network embodiment 400B of eNB interconnection with other eNBs on which aspects may be implemented. Network 400A may include a macro-eNB 402 and/or multiple additional eNBs, such as picocell eNBs 410. Network 400 may include an HeNB gateway 434 for scalability reasons. The macro-eNB 402 and the gateway 434 may each communicate with a pool 440 of mobility management entities (MME) 442 and/or a pool 444 of serving gateways (SGW) 446. The eNB gateway 434 may appear as a C-plane and a U-plane relay for dedicated S1 connections 436. An S1 connection 436 may be a logical interface specified as the boundary between an evolved packet core (EPC) and an Evolved Universal Terrestrial Access Network (EU-TRAN). As such, it provides an interface to a core network (not shown), which may be further coupled to other networks. The eNB gateway 434 may act as a macro-eNB 402 from an EPC point of view. The C-plane interface may be S1-MME and the U-plane interface may be S1-U. Allocation of subframes may be done by direct negotiations between eNBs and/or may be done in conjunction with a backhaul network. Network 400 may includes a macro-eNB 402 and multiple additional eNBs, which may be picocell eNBs 410.

The eNB gateway 434 may function as a single EPC node, with respect to an eNB 410. The eNB gateway 434 may ensure S1-flex connectivity for eNB 410. The eNB gateway 434 may provide a 1:n relay functionality such that a single eNB 410 may communicate with n MMEs 442. The eNB gateway 434 registers towards the pool 440 of MMEs 442 when put into operation via the S1 setup procedure. The eNB gateway 434 may support setup of S1 interfaces 436 with the eNBs 410.

Network 400A may also include a self organizing network (SON) server 438. The SON server 438 may provide automated optimization of a 3GPP LTE network. The SON server 438 may be a key driver for improving operation administration and maintenance (OAM) functions in the wireless communication system 400. An X2 link 420 may exist between the macro-eNB 402 and the eNB gateway 434. X2 links 420 may also exist between each of the eNBs 410 connected to a common eNB gateway 434. The X2 links 420 may be set up based on input from the SON server 438. An X2 link 420 may convey ICIC information. If an X2 link 420 cannot be established, the S1 link 436 may be used to convey ICIC information. Backhaul signaling may be used in communication system 400 to manage various functionality as described further herein between macro-eNB 402 and eNBs 410. For example, these connections may be used as further described successively herein to facilitate subframe allocation coordination and scheduling.

Figure 4B:
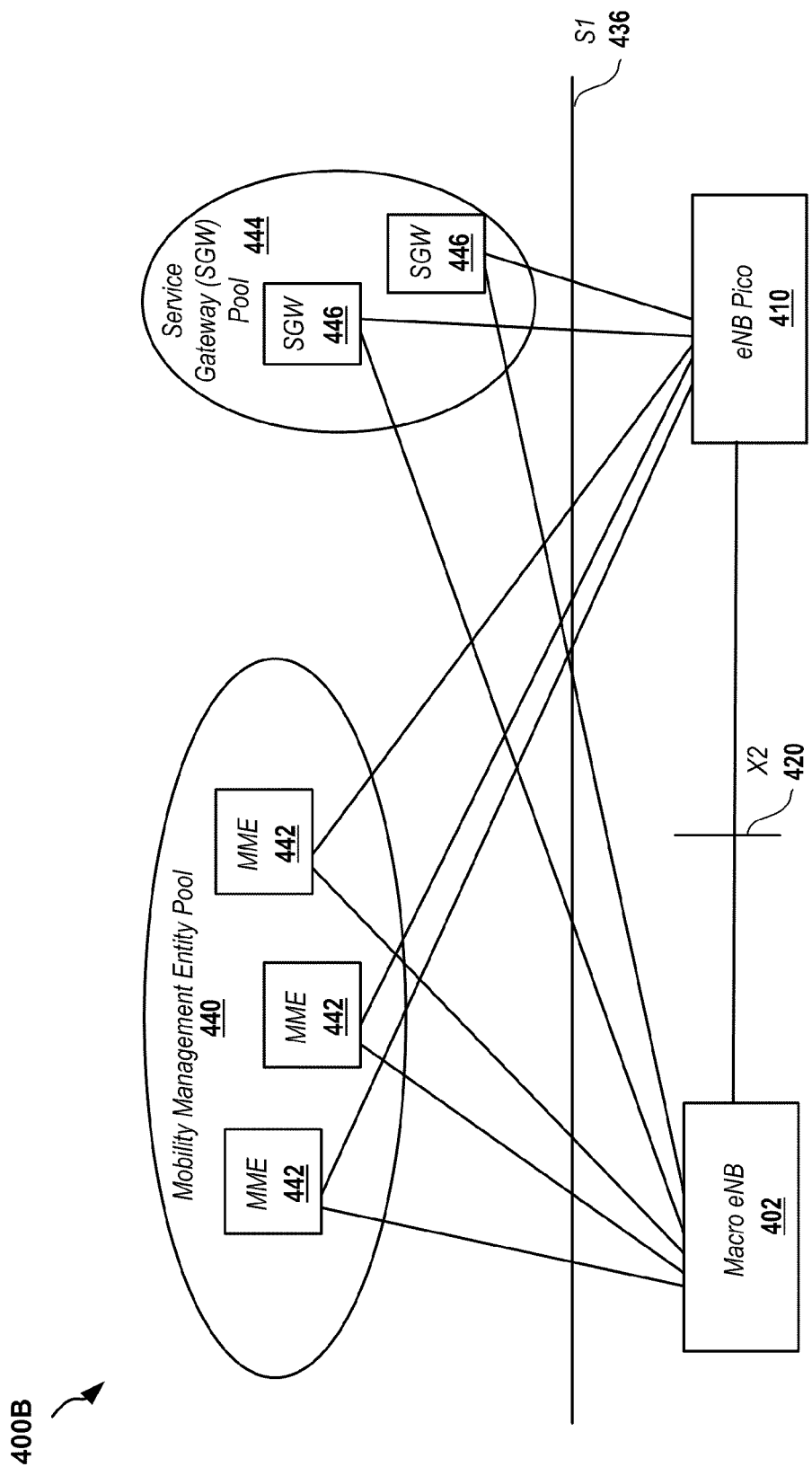
FIG. 4B illustrates details of a base station to base station communication connections in a wireless communications system.

FIG. 4B illustrates another example network embodiment 400B of eNB interconnection with other eNBs, such as may be used to implement inter-cell coordination in accordance with various aspects. In network 400B, no SON server is included, and macro eNBs, such as eNB 402, may communicate with other eNBs, such as pico eNB 410 (and/or with other base stations that are not shown).

In general, a UE within a network such as shown in FIG. 3 will attempt to connect or "camp" on a cell providing the strongest signal. However, in heterogenous network architectures, such as shown previously herein in FIG. 3, UEs may need to connect to a weaker cell if a stronger cell is unavailable, such as, for example, if it is part of a closed subscriber group (CSG) or when range expansion is used. For example, a neighboring or adjacent CSG base station may be located very close to the UE but may be inaccessible if the UE is not a member of the subscriber group. In range expansion implementations, it may be beneficial to associate a UE with a weak cell with a smaller path loss even though the transmit power of the weak cell is lower than that of a stronger cell. In some cases, time-division multiplexing (TDM) and/or frequency-division multiplexing (FDM) could be used so that a UE could transmit and/or receive data from a weak cell without suffering from strong cell interference. However, even if this approach is taken, certain important system information, such as, for example system information broadcasts (SIBs), paging information, and/or other data and information needs to be sent in certain specific subframes, which imply that SIB and paging cannot be supported with TDM partitioning. In addition, in order to read SIB and/or paging information, a UE needs to read control information in the physical downlink control channel (PDCCH) first. Due to the interleaved nature of the PDCCH, coordination across eNBs may be beneficial to interference coordination and mitigation.

Figure 5:
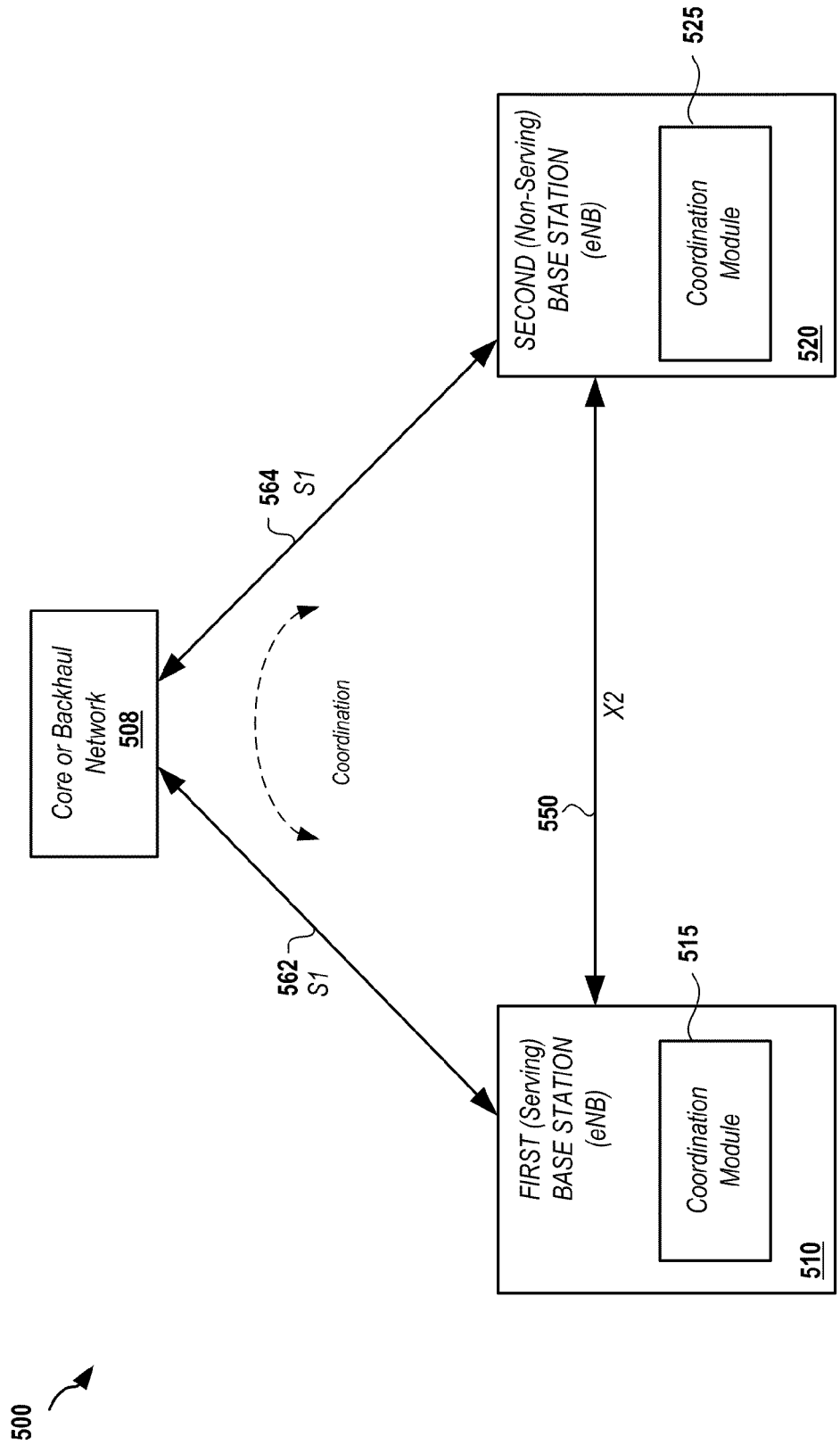
FIG. 5 illustrates details of an embodiment of components configured to facilitate inter-cell coordination in a wireless communication system.

FIG. 5 illustrates simplified example details of a communications system 500 on which inter-cell coordination in accordance with various aspects may be implemented. System 500 includes a base station or eNB 510, also denoted in this example as a first base station or first eNB. eNB 510 includes a coordination module 515, which may include hardware, firmware, and/or software for performing the coordination functionality described subsequently herein. Another eNB 520, also denoted in this example as a second base station or second eNB, may be in communication with eNB 510 to facilitate, among various functions, inter-cell interference coordination. eNB 520 may also include a coordination module 525 for performing the coordination functionality described subsequently herein. Various connections and interfaces may be used to provide communication between eNB 510 and eNB 520. In some cases, communication may be facilitated through a core or backhaul network 508, such as, for example, via S1 interfaces 562 and 564. In some cases, all or part of the interference coordination may be performed by or in conjunction with components of the core or backhaul network 508. In other implementations, coordination may be managed directly between eNBs 510 and 520, such as, for example, via an X2 connection 550 as shown in FIG. 5. For purposes of example, the first eNB 510 may be denoted as a serving base station or eNB, in communication with one or more served first UEs (not shown in FIG. 5). Second eNB 520 may likewise be denoted as a non-serving base station or eNB, indicating that it is not directly serving the first UE(s).

It is noted that the designations "First Base Station," "First eNB," "Second Base Station," "Second eNB," and the like are provided for purposes of illustration, and the features and functions associated with them are interchangeable, as well as applicable to other communication devices and components not shown in FIG. 5.

Figure 6:
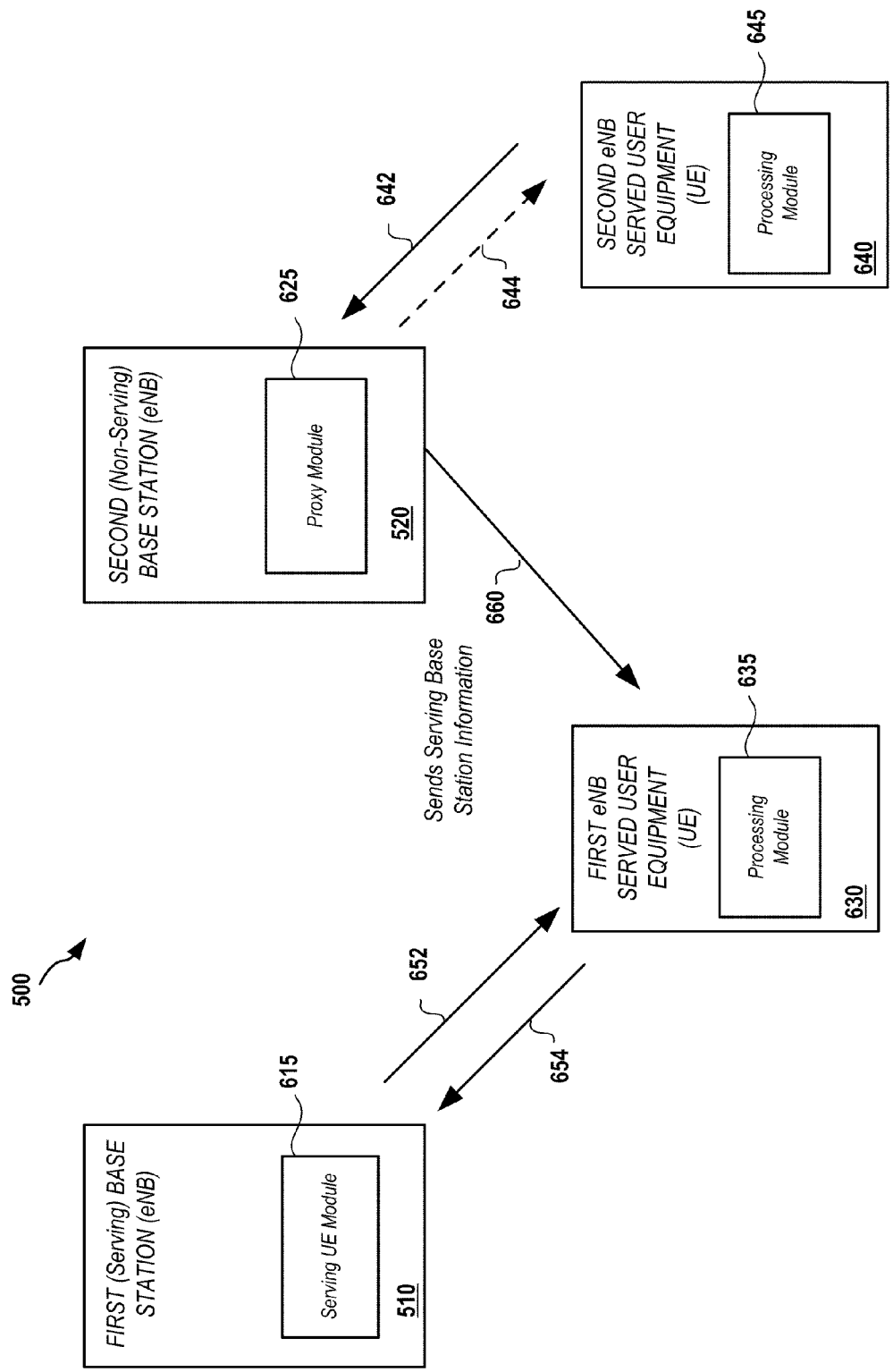
FIG. 6 illustrates details of an embodiment of components configured to provide proxy signaling in a wireless communication system.

FIG. 6 illustrates additional details of system 500 related to signal transmission between eNBs 510 and 520 and UEs 630 and 640. In particular, first or serving eNB 510 may be in communication with first or served UE 630 or may desire to communicate with UE 630. Communication links may include a downlink (DL) 652 between eNB 510 and UE 630, as well as an uplink (UL) 654 between UE 630 and eNB 520.

Likewise, second or non-serving base station 520 may be in communication with a second eNB served UE 640, such as, for example, via DL 644 and UL 642. In addition, eNB 520 may be creating interference (not shown) with UE 630, such as, for example, if signaling from eNB 520 is strong relative to that from eNB 510, which may be caused by, for example, close proximity between eNB 520 and UE 630.

In accordance with one aspect, the second eNB 520 may be configured to provide signaling via DL 660 that would otherwise be provided from eNB 510. This information may be provided in addition to that provided by eNB 510, such as from serving UE module 615 (for example, by using the same resource elements (REs) used by eNB 510). In this case, the signaling provided from eNB 520 would dominate or override over signaling provided from eNB 510. In some cases, signaling may also be changed from eNB 510, such as, for example to omit or adjust transmissions that are being done from eNB 520. eNB 510 may include a serving UE module 615, which may be configured to send and receive data and information to UE 630 via downlink 652 and uplink 654. This data and information may include control channel information, which may be replicated, in whole or part, by eNB 520.

This approach is distinguished from that traditionally used in that a particular base station is traditionally configured to provide signaling, and in particular signaling of certain control and related information, only to nodes within its cell, such as its served UEs. In accordance with this aspect, signaling, and in particular control signaling, may be performed from the second non-serving base station 520 to a UE 630 being served by a first base station 510 associated with a different cell. Such signaling may be provided based on coordination between eNB 520 and 510, such as using interconnections as shown in, for example FIG. 5. Consequently, eNB 520 may act as a proxy to at least some signaling that would normally be provided by eNB 510. This signaling may be facilitated by a proxy module 625, which may comprise hardware, firmware, and/or software to implement the proxy signaling.

As an example, the signal sent from non-serving second base station 520 to UE 630 may be the physical downlink control channel (PDCCH) or other control channel. Resource element (RE) allocation for signaling sent from eNB 520 may be, for example, the cell ID, PCFICH, and/or PHICH associated with the cell served by eNB 510. In one embodiment, eNB 520 sends the system information block (SIB) PDCCH for the cell associated with eNB 510. The PDCCH can have a different RNTI or CRC mask based on eNB 510s cell ID. In addition, coordination between the cells can be performed to orthogonalize the SIB resource block (RB) allocation.

If eNB 520 sends information associated with the cell served by eNB 510, it may, however, create problems with UEs it is serving, such as UE 640 shown in FIG. 6. In particular, transmission of DL 644 may be affected so as to appear as interference or otherwise create problems with UE 640 (e.g., when transmissions that are not aligned with its own resource grid, information may be sent to served UEs in improper resources since each cell has a unique way of indexed its resources). In effect, transmissions that are aligned with other cells may result in tone and frequency information being misplaced, such as the location of common reference signals (CRS), which is defined with respect to cell ID.

This may be mitigated by, for example, avoiding REs spanned by the PDCCH targeting for the cell associated with eNB 510 when it sends the PDCCH for its own UE (e.g., UE 640). Avoidance may be done by, for example, orthogonalizing PDCCH signaling, providing PDCCH power control, performing PDCCH puncturing, or by using other avoidance techniques. For example, for those REs where a strong cell needs to send its own PDCCH and which are occupied by the other cell's (e.g., the cell associated with eNB 510) PDCCH, the eNB (e.g., eNB 520) may not send any data on those REs and/or may lower power spectral density or adjust other signaling parameters. In some cases puncturing (i.e., dropping or not sending) data in certain resources may be done.

Figure 7:
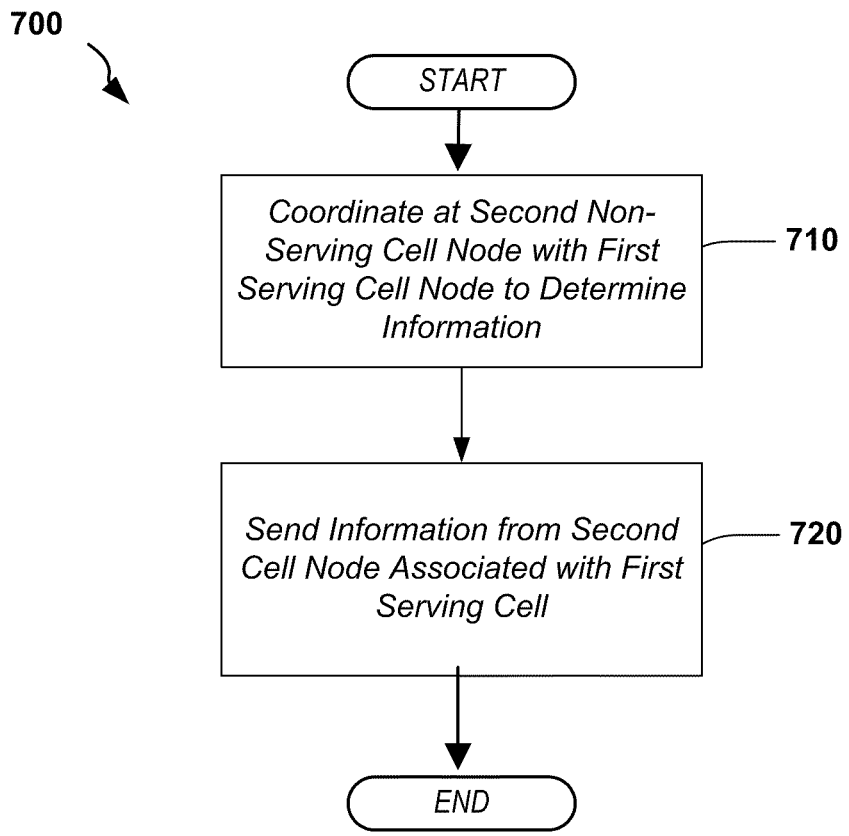
FIG. 7 illustrates an example embodiment of a process for providing proxy signaling between cells in a wireless communication system.

FIG. 7 illustrates an example process 700 for performing proxy communication, such as described with respect to FIG. 6. In advance of proxy transmission (e.g., transmission from, for example, eNB 520 to UE 630 of information associated with eNB 510), eNBs 510 and 520 may communicate, via, for example, interfaces such as are shown in FIGS. 4A, 4B, and 5. The communication may involve, for example, coordination at stage 710 to share information such as channel configuration information, PDCCH, PCFICH, PHICH, Cell ID, and/or other information between eNBs. At stage 720, the second eNB, e.g., eNB 520, may then send information, such as control information, that would normally be sent by the other node and associated cell, such as to UE 630. This may be done by, for example, proxy module 625. The proxy signaling, which may be sent via link 660, may then be received and processed at processing module 635.

In another aspect, two (or more) eNBs may communicate to coordinate signaling so as to minimize collisions and associated interference. The coordination may be done using, for example, signaling and interfaces between eNBs as described in, for example, FIGS. 4A, 4B, and 5. In one example, both eNBs may be aware of or made aware of interference conditions, such as, for example, via communications via X2 interfaces or in communication with a core network. Accordingly, the eNBs may coordinate use of resource so as to minimize interference (i.e., they can plan usage of their REs for control usage to minimize collision or overlap in REs).

As defined in the 3GPP LTE specification, control channels occupy certain time-frequency resources (e.g., REs). In particular, certain resources are allocated with control data, and channels such as the physical downlink control channel (PDCCH), the physical hybrid ARQ indicator channel (PHICH), and the physical control format indicator channel (PCFICH) may be allocated to certain resources, which may collide with data being sent on physical downlink shared channels (PDSCHs) from other cells and associated eNBs, such as described previously.

Figure 9:
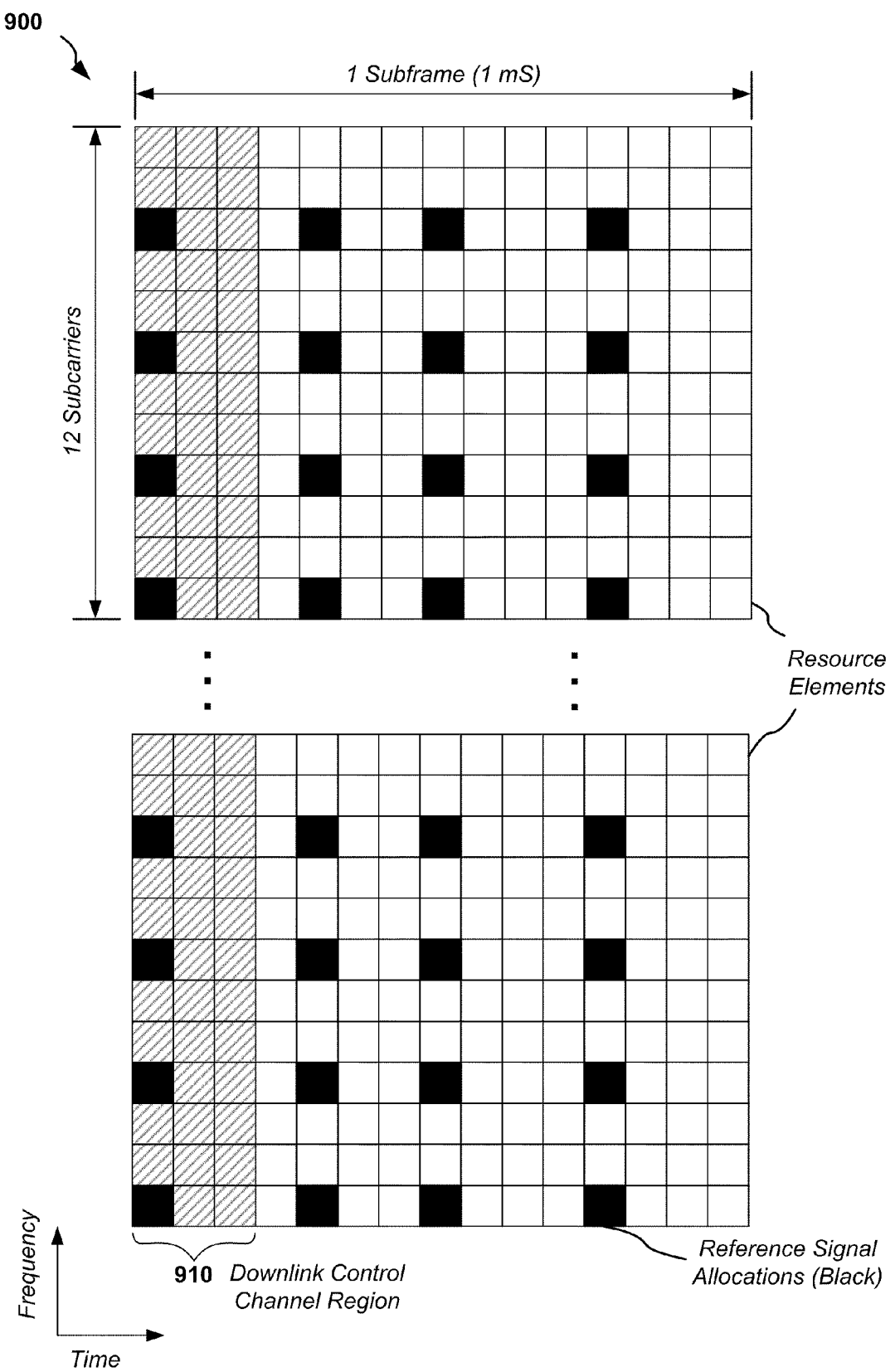
FIG. 9 illustrates an example resource configuration for downlink transmission in a wireless communication system.

Control channel signaling in LTE is used to provide physical layer signals or messages. In general, the downlink control channels can be configured to occupy the first 1, 2, or 3 OFDM symbols in a subframe, extending over the entire system bandwidth (which may be, for example, from six resource blocks, corresponding to 1.08 MHz, to 110 resource blocks or 19.8 MHz, as described in Release 8). An example of this is shown in FIG. 9, which illustrates one example resource configuration 900. In this example, the boxes represent resources, with frequency being shown vertically and OFDM symbols (time) being shown horizontally.

The resources associated with the first three OFDM symbols 910 are defined as a region for DL control channel use. In some special cases other control signaling may be used, such as, for example, in multicast/broadcast single frequency network (MBSFN) transmission or for narrowband implementations (e.g., less than 10 resource blocks).

Within this resource configuration 900, various control signals may be mapped. For example, the PCFICH, which carries a control format indicator (CFI) indicating the number of OFDM symbols being used (e.g., 1, 2, or 3 as shown in the example of FIG. 9) for transmission of control channel information in each subframe is mapped to certain resources. Specifically, The PCFICH is mapped to 16 resource elements (REs) using QPSK modulation, with the 16 resource elements distributed across the frequency domain in a predefined pattern in the first OFDM symbol in each downlink subframe (i.e., in the vertical direction as shown in FIG. 9) so that a UE receiving the signal can always locate the PCFICH information to decode the remaining control signaling. In addition, to minimize the possibility of confusion with PCFICH information from a neighboring cell, a cell-specific offset is applied to the positions of the PCFICH resource elements, which is dependent on physical cell ID (which may be determined from a primary synchronization signal (PSS) and a secondary synchronization signal (SSS)). A cell specific scrambling sequence is also applied to the CFI codewords to allow a UE to preferentially receive the PCFICH from the desired cell.

Another channel is the PHICH, which carries the hybrid automatic repeat request (HARM), indicating whether the base station or eNB has correctly received a transmission on the physical uplink shared channel (PUSCH). The PHICH duration is configurable, normally to either one or three OFDM symbols. The PHICH cannot extend into the PDSCH transmission region, which puts a lower limit on the size of the control channel region at the start of each subframe (as signaled by the PCFICH).

The PDDCH carries a message known as the downlink control information (DCI), which includes resource assignments and other control information for a UE or group of UEs. In general, several PDCCHs can be transmitted in a subframe. Each PDCCH is transmitted using one or more control channel elements (CCEs), where each CCE corresponds to nine sets of four physical resource elements known as resource element groups (REGs), with four QPSK symbols mapped to each REG. REGs are also used for the PCFICH and PCHICN control channels. The number of CCEs used for transmission of a particular PDCCH is determined by a base station or eNB according to channel condition information. For example, if the PDCCH is intended for a UE with a good downlink channel (for example, strong signal/close to eNB), then one CCE may be sufficient. If, however, there is a poor channel (for example, a UE near cell border or subject to interference) then multiple CCEs may be required to support robustness. In addition, the power level of the PDCCH may be adjusted to match the channel conditions.

In one aspect, coordination may include coordinating control signaling, such as with the above-described parameters, so as to mitigate interference between cells. For example, in one implementation, two (or more) eNBs may coordinate regarding the number of control symbols (i.e., OFDM symbols) to use for downlink control signaling. In a typical implementation, all cells within a region or coverage area would generally be configured to use the same number of symbols. However, by coordinating between nodes, such as eNBs in adjacent or neighboring cells that may be interfering, the number of symbols may be varied between the cells. For example, one cell may choose to use three symbols whereas another eNB may choose to use one or two. Other combinations may be also be used in various implementations.

In another aspect, PDCCH may be varied between cells. The PDCCH information bits are coded and rate matched, with the bits then scrambled with a cell-specific scrambling sequence, which is then mapped to blocks of four QPSK symbols (i.e., REGs). In one example, four PDCCH configurations may be available. If eNBs in adjacent cells choose these so as to minimize the number of collisions (e.g., overlapping resources). For example, one eNB can choose a first set of resources and a second eNB may choose a second set of resources. The resources can then be compared and adjusted so as to minimize overlap. In one example, PDCCH may have four places to send. If the first eNB picks one of the four choices and informs the other one of which one it has chosen, then the second eNB may then choose one of the remaining four. In some cases, the second eNB may evaluate each of the remaining choices and select the one creating the smallest number of collisions. Collisions may depend on parameters such as Cell ID, frame number, PDCCH channel ID or number, etc. These parameters may be varied to determine an assignment with a minimal number of collisions (i.e., RE overlaps between cells).

In one implementation, a first of the eNBs may notify a second (or other) eNB of the selected REGs and coordination may be done at this level. For example, the second or other eNBs may then compare other available resource element patterns and select one such as to minimize collision (e.g., resource element overlap).

The coordination may be done in a dynamic fashion and/or on a structural level, such as at the level of a subframe, and the coordination may be semi-static and/or be restricted to a subset of one radio-frame.

By performing coordination between nodes, such as eNBs, in adjacent or neighboring cells, UEs connected to, for example, a weak cell (such as an open macrocell where a closer cell, such as a closed subscriber group (CSG) femtocell or a picocell is creating interference).

Figure 8:
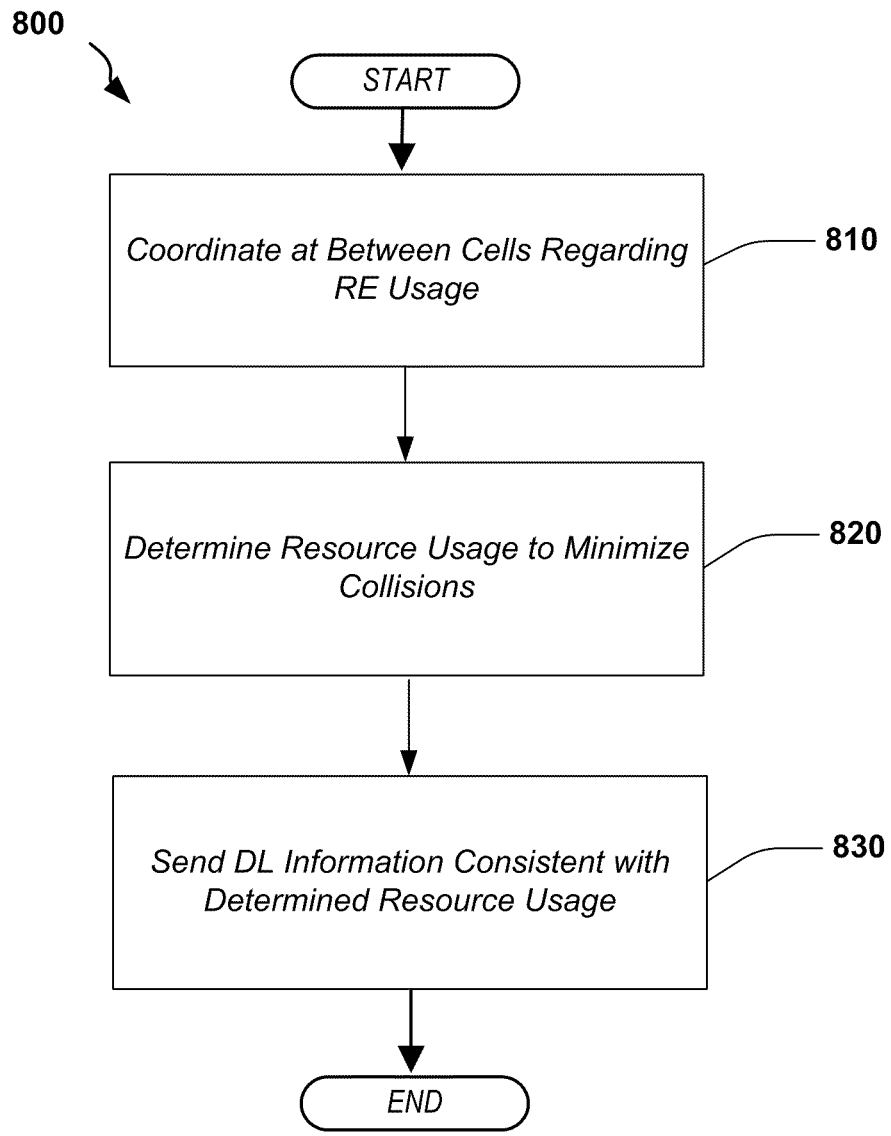
FIG. 8 illustrates an example embodiment of a process for inter-cell coordination to mitigate interference between cells in a wireless communication system.

FIG. 8 illustrates details of an example process 800 for performing coordination to mitigate interference. At stage 810, two (or more) base stations or eNBs, such as, for example, eNBs 510 and 520 of FIG. 6, may communicate regarding interference conditions and interest in coordination resources. The coordination may involve, for example, a first eNB selecting resource elements and sending this information to the second eNB. Other coordination is also possible, such as, for example, having the first or second eNB select a first set of resources and a second set of resources and communicating one or both of these to the other eNB. At stage 820, one or both eNBs may determine an appropriate resource usage. For example, in one implementation, the second eNB may select, based on information received from the first eNB, a potential resource usage, which may then be evaluated to determine a collision metric, such as the number of collisions (i.e., overlapping REs). REs, such as those shown in FIG. 9 associated with control signaling, may be selected so as to minimize overlap between cells at the RE level, REG level, CCE level, frame or subframe level, or based on other criteria. The coordination may be semi-static or may be restricted to a subset of a radio frame. In various implementations, one or multiple potential resource usages may be evaluated, and one may be chosen so as to minimize collisions. At stage 820, downlink signaling may then be provided from one or both eNBs, with the DL signaling provided so as to be consistent with the determined resource usage.

Figure 10:
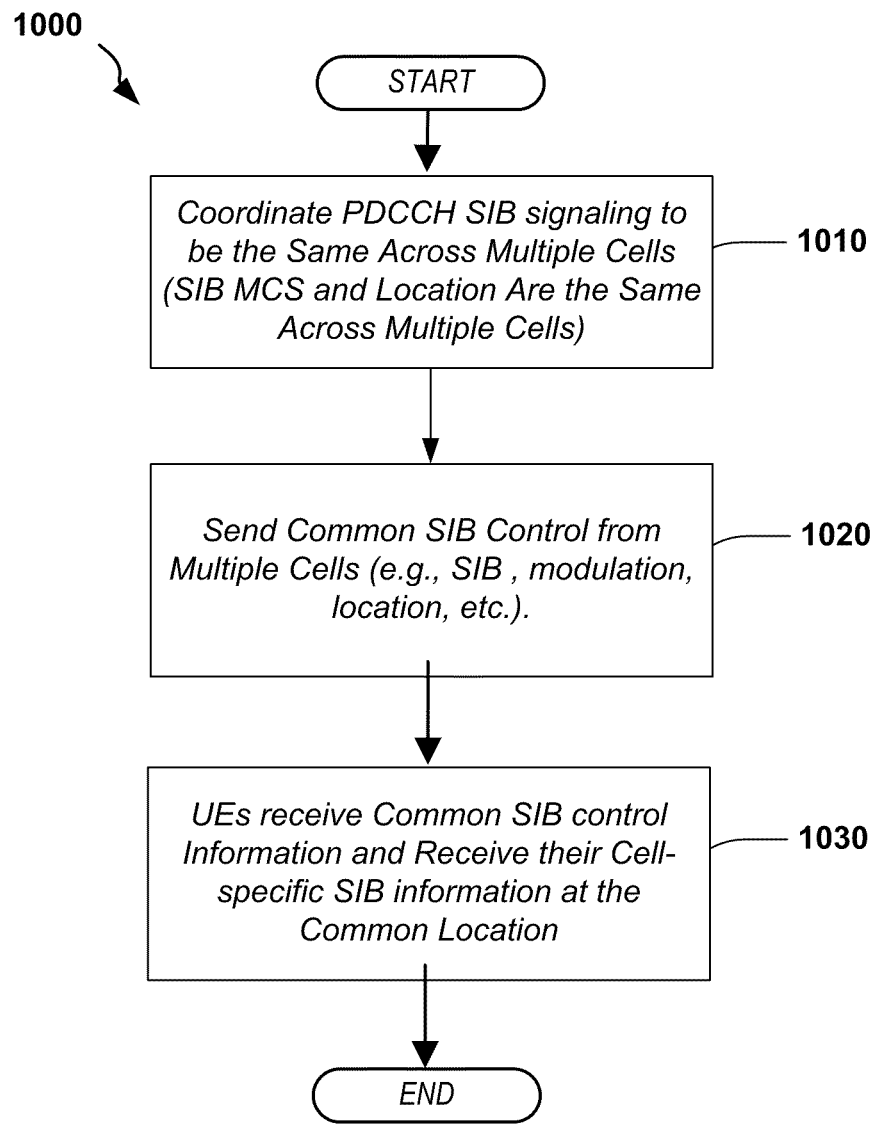
FIG. 10 illustrates an example embodiment of a process for providing system information block (SIB) location signaling across multiple cells.

FIG. 10 illustrates an example embodiment of a process 1000 for cross-cell signaling to provide system information blocks (SIBs). In conventional LTE implementations, each eNB/cell can locate SIBs independently (i.e., select cell-specific SIB locations are used across networks or regions). Alternately, in accordance with one aspect, SIB location (e.g., in PDCCH) may be common across cells with a network or region, with the cells transmitting common location information. Specifically, at stage 1010, multiple cells and associated eNBs, such as, for example, two or more eNBs as shown in FIG. 3, may coordinate so as to provide common control for SIB transmissions (e.g., location, modulation information, etc.). This may be done by coordination between cells and/or may be done by a core network function. Using the approach, all network nodes know where to locate SIB traffic (which is common to the network or region), which implies that SIB modulation and coding scheme (MCS) are the same throughout the network or region. In effect, this approach creates a semi-fixed scheduling, similar to that used for physical broadcast channel (PBCH) and other fixed channels, which are specification defined, however, in this case, SIB control information can be adjusted independently of specification requirements. At stage 1020, common SIB control signaling is sent from all cells, which may then by UEs to locate the SIB traffic for their served cell at stage 1030. The UE may then receive and decode appropriate SIB information.

Figure 11:
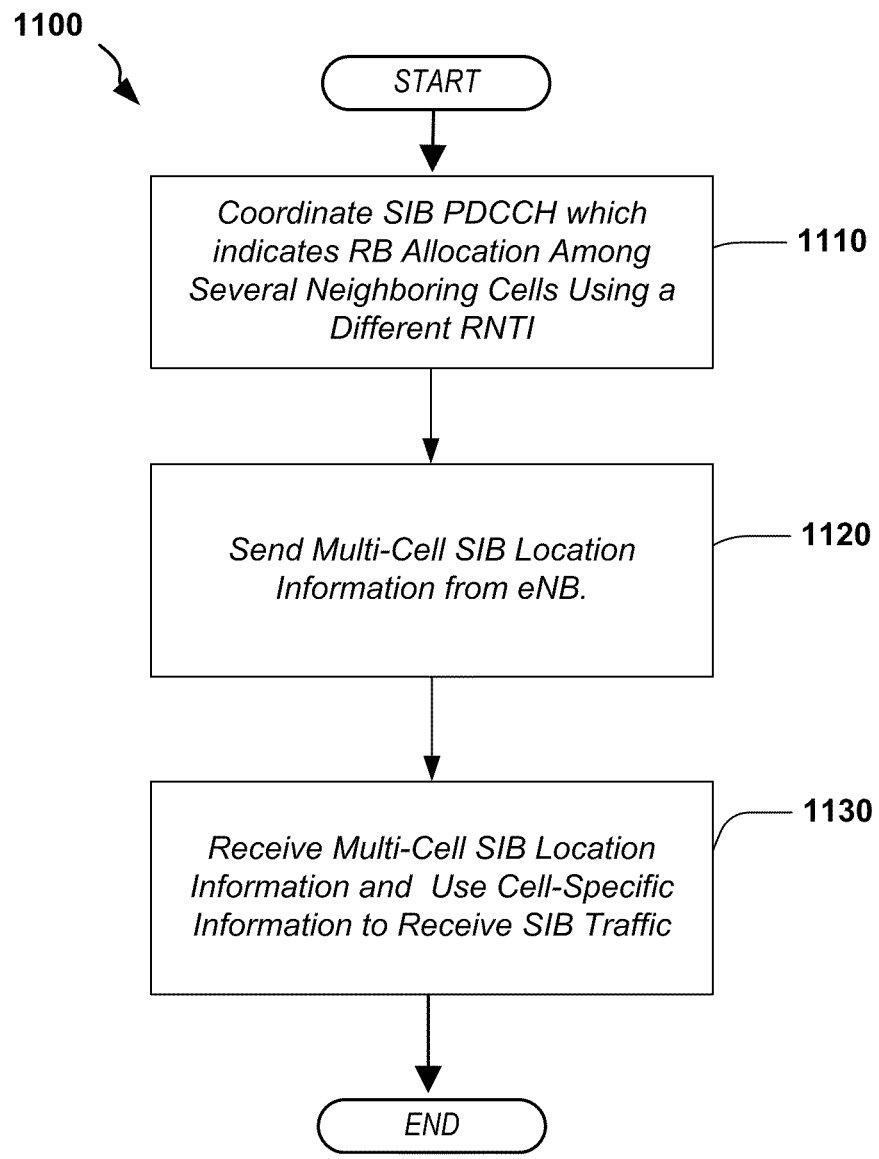
FIG. 11 illustrates an example embodiment of a process for providing SIB location signaling across multiple cells.

FIG. 11 illustrates an example embodiment of another process 1100 for cross-cell signaling to provide SIBs. In this case, a cell may send SIB information for neighbors as well as its own cell (i.e., multiple cell control information). For example, one cell sends SIB PDCCH that indicates resource block (RB) allocation among neighboring cells, using a different radio network temporary identification (RNTI). RNTIs are used primarily by the eNB Physical Layer (PHY) for scrambling the coded bits in each of the code words to be transmitted on the physical channel. This scrambling process in the PHY happens before modulation. There is a sequence followed for scrambling, calculation of which depends on the RNTI (UE specific for channels like PDSCH, PUSCH) and cell specific (for broadcast channels like PBCH). Specifically, at stage 1110, two base stations or eNBs, such as those shown in FIG. 3, may coordinate to indicate resource block allocation for their respective cells. At stage 1120, Multi-cell SIB location information may be sent from one or more eNBs. At stage 1130, UEs receive multi-cell SIB location information and extract their cell-specific information, which may then be used to receive and process SIB traffic associated with their cell. In some cases, multi-cell SIB location information may also be used at a UE to receive and process SIB traffic from other cells, such as adjacent cells. This may be implemented by, for example, using reserved bits in the SIB PDCCH to convey bitmap information for resource blocks. In general, the same SIB MCS will be used across multiple cells. Cell coordination may be further performed to orthogonalize the SIB RB allocation.

In addition to signaling control information, as described previously, in another aspect traffic may also be signaled across cells. For example, in one implementation, first eNB sends the physical downlink shared channel (PDSCH) for a UE or UEs connected to a different cell or cells. In this case, information, such as SIB information from a different cell or cells, may be concatenated to an eNBs own SIB information.

In another aspect, cross-cell signaling with an RNTI mask may be used in this case, an eNB in a first cell sends SIB and/or paging and/or data information for users in a second cell, with a special RNTI, which may be different from an RNTI defined in a specification, such as, for example, Release 8. The PDCCH allocation for SIB and/or paging, and/or data transmitted from the first cell but targeted for the second cell may be based on the first cell's cell ID, PCFICH and PCICH configuration. The UE served by the first cell may need to read the PBCH and PCFICH from the first cell. The cell ID link to special SIB/Paging RNTI may be conveyed in the first cell's SIB information and/or through radio resource control (RRC) signaling. In some embodiments, the special SIB/Paging RNTI may be allocated based on reserved RNTIs in a specification, such as, for example, Release 8.

In another aspect, a first eNB may signal a UE as to whether it can decode its control and/or data from a different cell or cells. This may be done by, for example, using a broadcast channel, through RRC signaling, and or via other eNB to UE signaling. In this case, the UE may need to read the first cell's SIB information (sent by the first eNB) and a second cells SIB/Paging information, which may be sent by a first eNB or a second eNB associated with the second cell.

Figure 12:
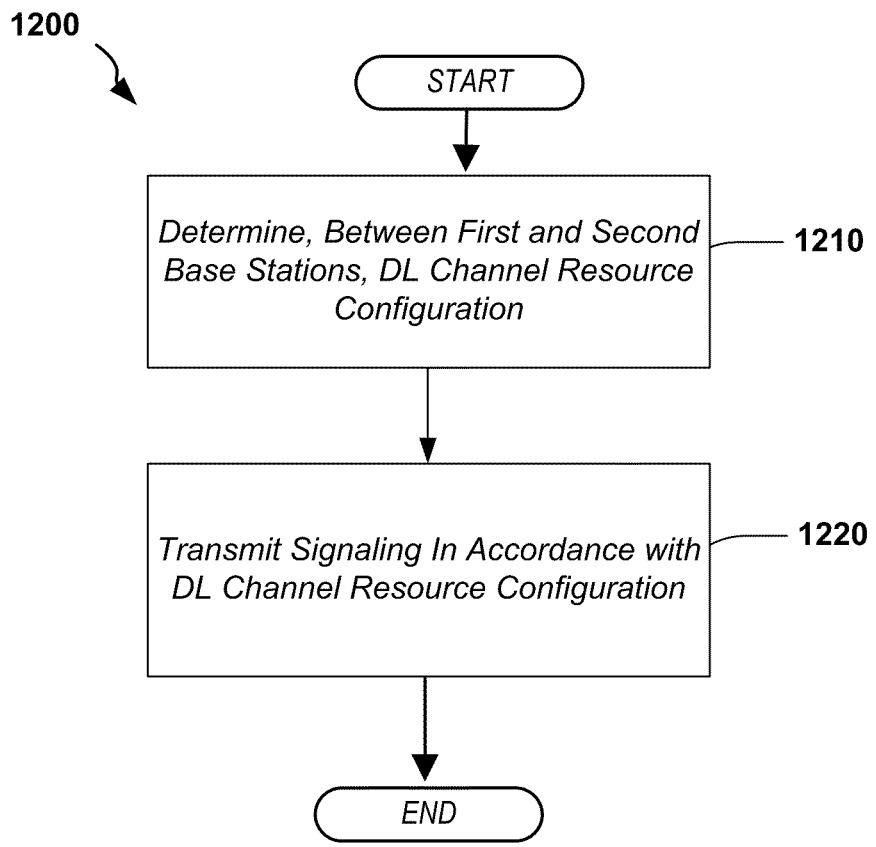
FIG. 12 illustrates an example embodiment of a process for providing coordination DL transmissions to facilitate interference mitigation in a wireless communication system.

FIG. 12 illustrates an embodiment of a process 1200 for coordinated transmission between nodes in a wireless communication system. At stage 1210, a DL channel resource configuration may be determined between a first and a second base station or eNB, such as are shown in, for example, FIGS. 3 and 5. The DL channel resource configuration may be determined by one or both base stations, and/or in conjunction with another component, such as a core network element, such as is shown in FIG. 2. The configuration may be determined so as to minimize interference between the second base station and a terminal or user equipment (UE) served by the first base station. At stage 1210, signaling may be transmitted from the second base station, consistent with the DL channel resource configuration.

The DL channel may be, for example, a control channel. The determining may include, for example, coordinating a different number of symbols to be allocated between the first base station and the second base station for control channel signaling. The number of symbols used may be allocated, for example, as one symbol for the first base station and two symbols for the second base station, or one symbol for the second base station and two symbols for the first base station, or two symbols for the first base station and three symbols for the second base station, or other combinations of different numbers of symbols between the first and base stations (as well as for additional base stations, such as in implementations where coordination is performed between more than two base stations).

The DL channel may be, for example, a control channel. The control channel resource configuration may relate to a channel configuration determined on a resource element (RE) level, a REG level, and/or a control channel element (CCE) level. The control channel resource configuration may be dynamically determined with respect to one or more subframes. The control channel resource configuration may be determined semi-statically. The control channel resource configuration may be determined with respect to a subset of a radio frame.

The DL channel may include a control channel and a physical downlink shared channel (PDSCH). The DL channel may include one or more of a physical downlink control channel (PDCC), a physical control format indicator channel (PCFICH), a physical hybrid ARQ indicator (PHICH) channel, and a physical downlink shared channel (PDSCH).

The minimizing interference may include determining a DL channel resource configuration so as to set the percentage of collisions between one or more channels from the first base station and one or more channels from the second base station below a predetermined threshold. The one or more channels may include one or more of a PDCC, a PCFICH, a PHICH, and a PDSCH.

Signaling may be provided from the first base station and/or additional base stations. The signaling from the first base station and/or additional base stations may also be consistent with the DL channel resource configuration.

Figure 13:
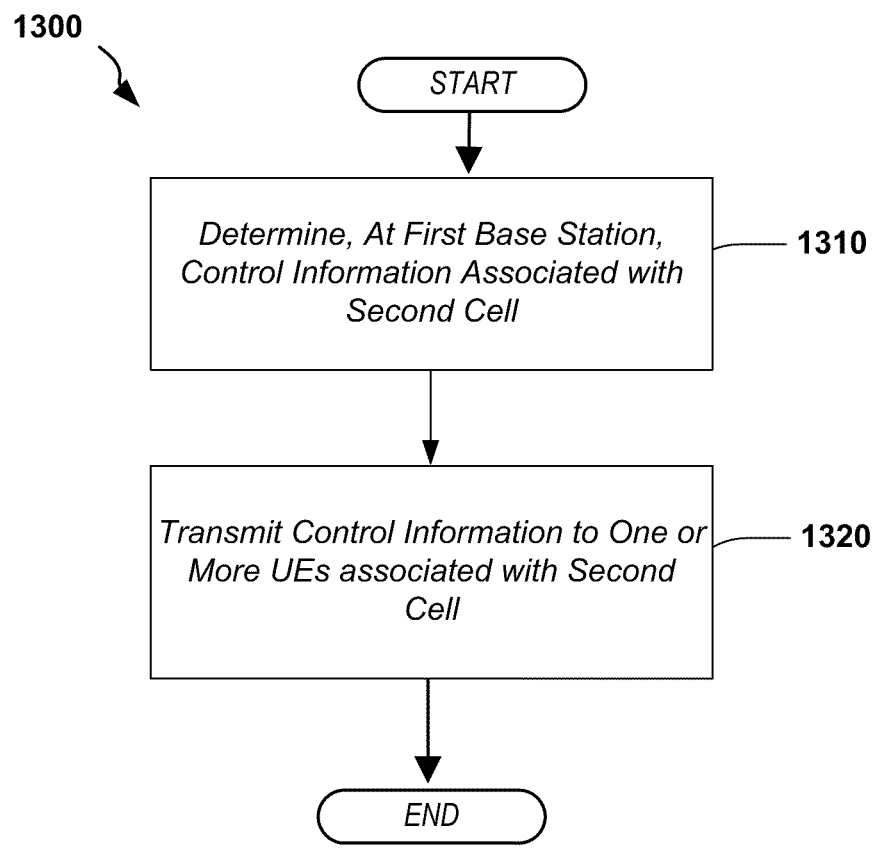
FIG. 13 illustrates an example embodiment of a process for providing proxy signaling from a base station in one cell to a terminal in another cell.

FIG. 13 illustrates an embodiment of an example process 1300 for providing proxy signaling from a base station or eNB in one cell to a terminal or UE in another cell. At stage 1310, control information may be received or determined, at a first base station or eNB associated with a first cell, where the control information is associated with a second cell served by a second eNB. For example, the first and second eNBs may be eNBs as shown in FIGS. 3 and 6 (the first and second eNBs may be reversed relative to the configuration shown in FIG. 6). At stage 1320, the control information may be sent from the second cell and associated UE, with the information sent so as to be received by one or more UEs in the first cell, being served by the first eNB. The control information sent from the first base station may be associated with a second eNB serving the second network cell.

The determining may include, for example, identifying a set of downlink channel resources based on a characteristic associated with the second network cell. The characteristic may include one or more of a cell ID of the second network cell, a PCFICH configuration, and a PHICH configuration. The control information may include one or more of control signaling, paging information, and system information broadcast (SIB) information.

The transmitting may include, for example, sending the information on a downlink channel comprising at least one of a PCFICH, PDCCH and PHICH consistent with downlink channel information associated with the second network cell.

The process may further include, for example, transmitting other information from the first base station to one or more UEs associated with the first network cell. The transmitting may use a transmission resource configuration determined based upon the downlink channel resources. The process may further include selecting the transmission resource configuration so as to avoid creating interference with the downlink channel resources. The other information may be transmitted using a PDCCH, and the transmission resource configuration may be selected so as to reduce interference with PDCCH resources associated with the second network cell.

The interference may be reduced by, for example, selecting the transmission resource configuration in accordance with at least one of PDCCH orthogonalization, PDCCH power control, and PDCCH puncturing. The information may include, for example, at least one of paging or SIB information associated with the second network cell. The transmitting may include sending the information on a PDSCH.

The information may further include, for example, SIB information associated with the first network cell. The SIB information may be associated with the second network cell, and may be concatenated to the SIB information associated with the first network cell. The transmitting may include, for example, applying an RNTI mask to the information. The process may further include transmitting information relating to the RNTI mask within at least one of SIB information and RRC signaling information. The process may further including selecting the RNTI mask from a predefined set of reserved RNTIs.

Figure 14:
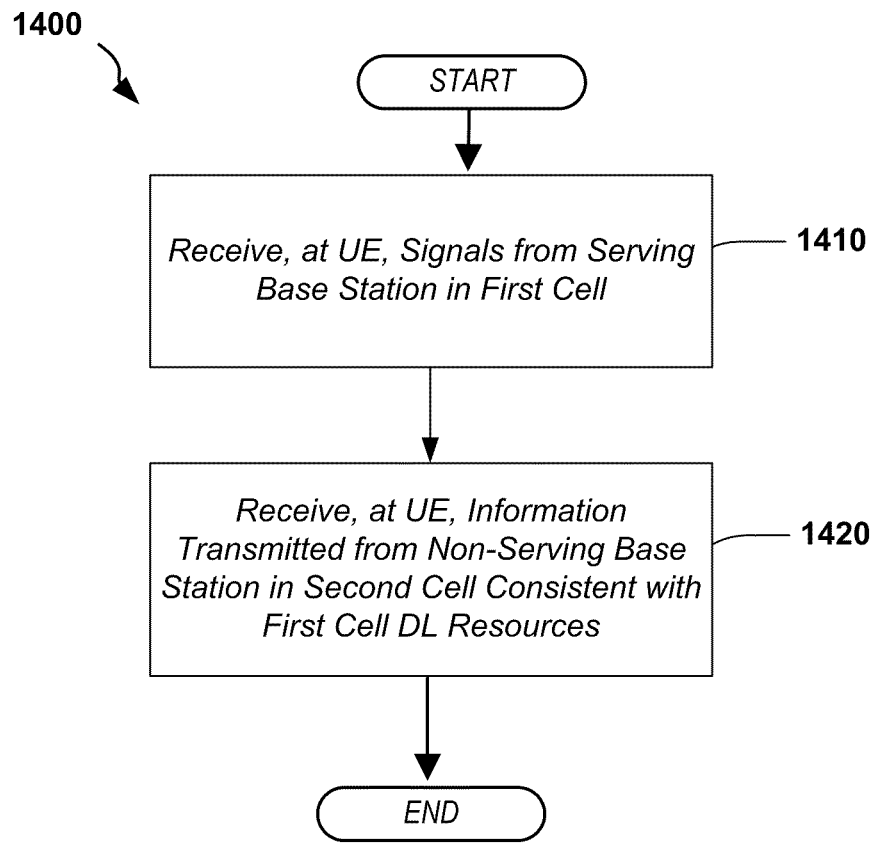
FIG. 14 illustrates an example embodiment of a process for receiving cross-coordinated DL signaling at a UE in a wireless communication network.

FIG. 14 illustrates an embodiment of an example process 1400 for providing wireless communications. The process 1400 may be implemented in a wireless network device such as a terminal or UE, such as those shown in FIGS. 3, 6 and 15. At stage 1410 signals from a serving base station in a first cell may be received. These signals may be, for example, subject to interference from an eNB in a second cell. At stage 1420, information may be received at the UE from another base station, which may be a second base station in another cell, such as shown in FIGS. 3 and 6. The information may be provided from the second base station in accordance with downlink channel resources associated with the first cell and first base station.

The downlink channel resources may be determined, for example, based upon a characteristic associated with the first network cell. The characteristics may include one or more of a cell ID of the first network cell, a PCFICH configuration, and a PHICH configuration. The information may include one or more of control signaling, paging information, and SIB information. The receiving the information may include receiving the information on a downlink channel. The downlink channel may include one or more of a PCFICH, PDCCH, and PHICH. The information may include at least one of paging or SIB information associated with the first network cell.

The receiving the information may include receiving the information on a PDSCH. The information may further include, for example, SIB information associated with the second network cell. The SIB information may be associated with the first network cell, and may be concatenated to the SIB information associated with the second network cell.

Figure 15:
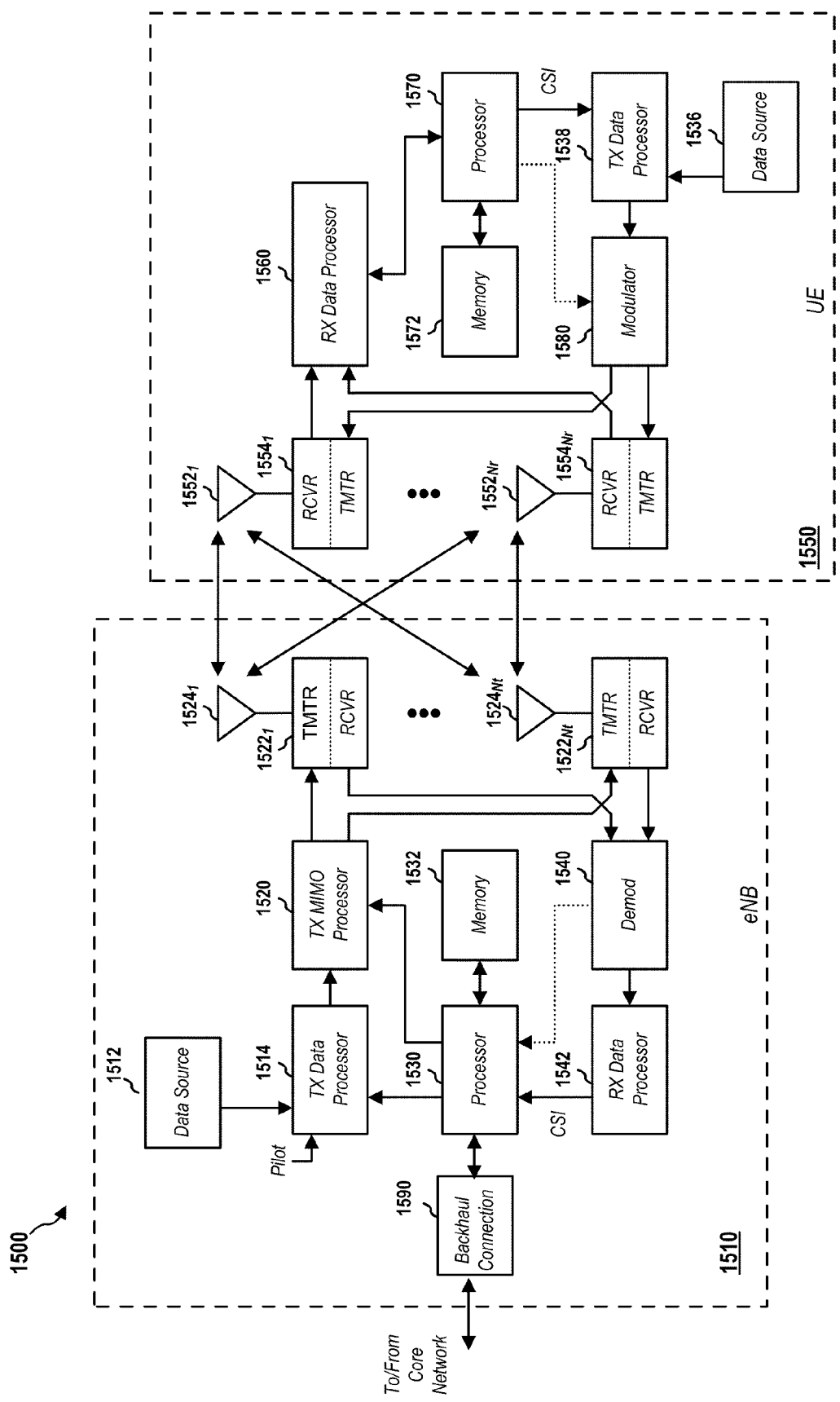
FIG. 15 illustrates details of an embodiment of a communication system including a terminal or UE and a base station or eNB.

FIG. 15 illustrates a block diagram of an embodiment of base station 1510 (i.e., an eNB, HeNB, etc.) and a terminal 1550 (i.e., a terminal, AT or UE, etc.) in an example LTE communication system 1500, on which the aspect and functionality described herein may be implemented. These systems may correspond to those shown in FIGS. 1-6, and may be configured to implement the processes illustrated previously herein in FIGS. 7, 8, and 10-14.

Various functions may be performed in the processors and memories as shown in base station 1510 (and/or in other components not shown), such as coordination with other base stations (not shown) to facilitate interference mitigation, to transmit and receive signaling from other base stations and UEs, as well as to provide other functionality as described herein. UE 1550 may include one or more modules to receive signals from base station 1510 and/or other base stations (not shown, such as non-serving base stations described previously herein) to receive DL signals, determine channel characteristics, perform channel estimates, demodulate received data and generate spatial information, determine power level information, and/or other information associated with base station 1510 or other base stations (not shown).

In one embodiment, base station 1510 may coordinate with other base stations as described previously herein to determine and send signaling, such as signaling associated with another base station and associated cell. This may be done in one or more components (or other components not shown) of base station 1510, such as processors 1514, 1530 and memory 1532. Base station 1510 may also include a transmit module including one or more components (or other components not shown) of eNB 1510, such as transmit modules 1524. Base station 1510 may include an interference cancellation module including one or more components (or other components not shown), such as processors 1530, 1542, demodulator module 1540, and memory 1532 to provide interference cancellation functionality. Base station 1510 may include a subframe partition coordination module including one or more components (or other components not shown), such as processors 1530, 1514 and memory 1532 to perform cross-cell coordination and signal transmission functions as described herein and/or manage the transmitter module, which may be used to send coordination DL information and/or proxy information. Base station 1510 may also include a control module for controlling receiver functionality. Base station 1510 may include a network connection module 1590 to provide networking with other systems, such as backhaul systems in the core network or other components as shown in FIG. 2.

Likewise, UE 1550 may include a receive module including one or more components of UE 1550 (or other components not shown), such as receivers 1554. UE 1550 may also include a signal information module including one or more components (or other components not shown) of UE 1550, such as processors 1560 and 1570, and memory 1572. In one embodiment, one or more signals received at UE 1550 are processed to receive DL signals and/or extract information such as SIB information from the DL signals. Additional processing may include estimating channel characteristics, power information, spatial information and/or other information regarding eNBs, such as base station 1510 and/or other base stations (not shown). Memories 1532 and 1572 may be used to store computer code for execution on one or more processors, such as processors 1560, 1570 and 1538, to implement processes associated with the aspects and functionality described herein.

In operation, at the base station 1510, traffic data for a number of data streams may be provided from a data source 1512 to a transmit (TX) data processor 1514, where it may be processed and transmitted to one or more UEs 1550. The transmitted data may be controlled as described previously herein so as to provide interlaced subframe transmissions and/or perform associated signal measurements at one or more UEs 1550.

In one aspect, each data stream is processed and transmitted over a respective transmitter sub-system (shown as transmitters 1524$_1$-1524$_{Nt}$) of base station 1510. TX data processor 1514 receives, formats, codes, and interleaves the traffic data for each data stream based on a particular coding scheme selected for that data stream so as to provide coded data. In particular, base station 1510 may be configured to determine a particular reference signal and reference signal pattern and provide a transmit signal including the reference signal and/or beamforming information in the selected pattern.

The coded data for each data stream may be multiplexed with pilot data using OFDM techniques. The pilot data is typically a known data pattern that is processed in a known manner and may be used at the receiver system to estimate the channel response. For example, the pilot data may include a reference signal. Pilot data may be provided to TX data processor 1514 as shown in FIG. 15 and multiplexed with the coded data. The multiplexed pilot and coded data for each data stream may then be modulated (i.e., symbol mapped) based on a particular modulation scheme (e.g., BPSK, QSPK, M-PSK, M-QAM, etc.) selected for that data stream so as to provide modulation symbols, and the data and pilot may be modulated using different modulation schemes. The data rate, coding, and modulation for each data stream may be determined by instructions performed by processor 1530 based on instructions stored in memory 1532, or in other memory or instruction storage media of UE 1550 (not shown).

The modulation symbols for all data streams may then be provided to a TX MIMO processor 1520, which may further process the modulation symbols (e.g., for OFDM implementation). TX MIMO processor 1520 may then provide Nt modulation symbol streams to N$_t$ transmitters (TMTR) 1522$_1$ through 1522$_{Nt}$. The various symbols may be mapped to associated RBs for transmission.

TX MIMO processor 1530 may apply beamforming weights to the symbols of the data streams and corresponding to the one or more antennas from which the symbol is being transmitted. This may be done by using information such as channel estimation information provided by or in conjunction with the reference signals and/or spatial information provided from a network node such as a UE. For example, a beam B=transpose([b1 b2 . . . b$_{Nt}$]) composes of a set of weights corresponding to each transmit antenna. Transmitting along a beam corresponds to transmitting a modulation symbol x along all antennas scaled by the beam weight for that antenna; that is, on antenna t the transmitted signal is bt*x. When multiple beams are transmitted, the transmitted signal on one antenna is the sum of the signals corresponding to different beams. This can be expressed mathematically as B1×1+B2× 2+BN$_S$×N$_S$, where N$_S$ beams are transmitted and xi is the modulation symbol sent using beam Bi. In various implementations beams could be selected in a number of ways. For example, beams could be selected based on channel feedback from a UE, channel knowledge available at the eNB, or based on information provided from a UE to facilitate interference mitigation, such as with an adjacent macrocell.

Each transmitter sub-system 1522$_1$ through 1522$_{Nt}$ receives and processes a respective symbol stream to provide one or more analog signals, and further conditions (e.g., amplifies, filters, and upconverts) the analog signals to provide a modulated signal suitable for transmission over the MIMO channel. N$_t$ modulated signals from transmitters 1522$_1$ through 1522$_{Nt}$ are then transmitted from N$_t$ antennas 1524$_1$ through 1524$_{Nt}$, respectively.

At UE 1550, the transmitted modulated signals are received by N$_r$ antennas 1552$_1$ through 1552$_{Nr}$, and the received signal from each antenna 1552 is provided to a respective receiver (RCVR) 1554$_1$ through 1552$_{Nr}$. Each receiver 1554 conditions (e.g., filters, amplifies and downconverts) a respective received signal, digitizes the conditioned signal to provide samples, and further processes the samples to provide a corresponding "received" symbol stream.

An RX data processor 1560 then receives and processes the N$_r$ received symbol streams from N$_r$ receivers 1554$_1$ through 1552$_{Nr}$ based on a particular receiver processing technique so as to provide N$_s$ "detected" symbol streams so at to provide estimates of the N$_s$ transmitted symbol streams. The RX data processor 1560 then demodulates, deinterleaves, and decodes each detected symbol stream to recover the traffic data for the data stream. The processing by RX data processor 1560 is typically complementary to that performed by TX MIMO processor 1520 and TX data processor 1514 in base station 1510.

A processor 1570 may periodically determine a precoding matrix for use as is described further below. Processor 1570 may then formulate a reverse link message that may include a matrix index portion and a rank value portion. In various aspects, the reverse link message may include various types of information regarding the communication link and/or the received data stream. The reverse link message may then be processed by a TX data processor 1538, which may also receive traffic data for a number of data streams from a data source 1536 which may then be modulated by a modulator 1580, conditioned by transmitters 1554$_1$ through 1554$_{Nr}$, and transmitted back to base station 1510. Information transmitted back to base station 1510 may include power level and/or spatial information for providing beamforming to mitigate interference from base station 1510.

At base station 1510, the modulated signals from UE 1550 are received by antennas 1524, conditioned by receivers 1522, demodulated by a demodulator 1540, and processed by a RX data processor 1542 to extract the message transmitted by UE 1550. Processor 1530 then determines which precoding matrix to use for determining beamforming weights, and then processes the extracted message.

In some configurations, the apparatus for wireless communication includes means for performing various functions as described herein. In one aspect, the aforementioned means may be a processor or processors and associated memory in which embodiments reside, such as are shown in FIG. 15, and which are configured to perform the functions recited by the aforementioned means. The may be, for example, modules or apparatus residing in UEs, eNBs, and/or other network nodes such as are shown in FIGS. 1-6 and 15 to perform the cross-cell coordination and information transmission functions as are described herein. In another aspect, the aforementioned means may be a module or any apparatus configured to perform the functions recited by the aforementioned means.

In one or more exemplary embodiments, the functions, methods and processes described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

It is understood that the specific order or hierarchy of steps or stages in the processes and methods disclosed are examples of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. In some implementations, processors may be processors, such as communications processors, specifically designed for implementing functionality in communications devices or other mobile or portable devices.

The steps or stages of a method, process or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the disclosure is not intended to be limited to the aspects shown herein but is to be accorded the widest scope consistent with the principles and novel features disclosed herein. It is intended that the following claims and their equivalents define the scope of the disclosure.

We claim:

1. A method for facilitating wireless communications, comprising:
    exchanging, by a first base station with a second base station, information related to an interference condition for control channel transmissions between the second base station and a user equipment (UE) served by the second base station, wherein the exchanging comprises receiving, by the first base station, control information corresponding to an assignment of resources to the UE for a future data transmission over a downlink channel from the second base station to the UE; and
    transmitting downlink control channel signaling from the first base station to the UE served by the second base station, wherein the downlink control channel signaling comprises the assignment of resources to the UE for the future data transmission from the second base station.

2. The method of claim 1, wherein the control information relates to at least one of a physical downlink control channel (PDCCH), a physical hybrid ARQ indicator channel (PHICH), and a synchronization channel.

3. The method of claim 1, wherein a resource element allocation for the downlink control channel signaling is based on a characteristic associated with the second base station.

4. The method of claim 3, wherein the characteristic comprises at least one of a cell ID of a second network cell associated with the second base station, a PCFICH configuration, or a PHICH configuration.

5. The method of claim 1, wherein the control information comprises one or more of control signaling, paging information, or system information broadcast (SIB) information.

6. The method of claim 1, wherein the transmitting includes sending the control information on a downlink channel comprising at least one of a PCFICH, PDCCH, or PHICH.

7. The method of claim 1, wherein the control information identifies downlink channel resources of the downlink channel from the second base station for the data transmission based at least in part on a cell ID of a second network cell associated with the second base station.

8. The method of claim 1, wherein the first base station is in a first network cell and the second base station is in a second network cell.

9. The method of claim 8, wherein the first network cell is associated with a first cell ID and the second network cell is associated with a second, different cell ID.

10. The method of claim 1, wherein the downlink channel from the second base station comprises a physical downlink shared channel (PDSCH) for the UE.

11. The method of claim 1, wherein the interference condition for control channel transmissions between the second base station and the UE served by the second base station is caused by proximity of the UE to the first base station.

12. A non-transitory computer-readable medium comprising code for causing a computer to:
exchange, by a first base station with a second base station, information related to an interference condition for control channel transmissions between the second base station and a user equipment (UE) served by the second base station, wherein the exchanging comprises receiving, by the first base station, control information corresponding to an assignment of resources to the UE for a future data transmission over a downlink channel from the second base station to the UE; and
send downlink control channel signaling from the first base station to the UE served by the second base station, wherein the downlink control channel signaling comprises the assignment of resources to the UE for the future data transmission from the second base station.

13. A communications device, comprising:
a memory; and
a processor coupled to the memory, and configured to exchange, by a first base station with a second base station, information related to an interference condition for control channel transmissions between the second base station and a user equipment (UE) served by the second base station, wherein the exchanging comprises receiving, by the first base station, control information corresponding to an assignment of resources to the UE for a future data transmission over a downlink channel from the second base station to the UE; and
send downlink control channel signaling from the first base station to the UE served by the second base station, wherein the downlink control channel signaling comprises the assignment of resources to the UE for the future data transmission from the second base station.

14. The communications device of claim 13, wherein the control information identifies downlink channel resources of the future downlink data transmission from the second base station based at least in part on a cell ID of a second network cell associated with the second base station.

15. The communications device of claim 13, wherein the first base station is in a first network cell and the second base station is in a second network cell.

16. The communications device of claim 15, wherein the first network cell is associated with a first cell ID and the second network cell is associated with a second, different cell ID.

17. The communications device of claim 13, wherein the downlink channel from the second base station comprises a physical downlink shared channel (PDSCH) for the UE.

18. The communications device of claim 13, wherein the interference condition for control channel transmissions between the second base station and the UE served by the second base station is caused by proximity of the UE to the first base station.

19. A communications device, comprising:
means for exchanging, by a first base station with a second base station, information related to an interference condition for control channel transmissions between the second base station and a user equipment (UE) served by the second base station, wherein the exchanging comprises receiving, by the first base station control information corresponding to an assignment of resources to the UE for a future data transmission over a downlink channel from the second base station to the UE; and
means for sending downlink control channel signaling from the first base station to the UE served by the second base station, wherein the downlink control channel signaling comprises the assignment of resources to the UE for the future data transmission from the second base station.

20. The communications device of claim 19, wherein the control information identifies downlink channel resources of the future downlink data transmission from the second base station based at least in part on a cell ID of a second network cell associated with the second base station.

21. The communications device of claim 19, wherein the first base station is in a first network cell and the second base station is in a second network cell.

22. The communications device of claim 21, wherein the first network cell is associated with a first cell ID and the second network cell is associated with a second, different cell ID.

23. The communications device of claim 19, wherein the downlink channel from the second base station comprises a physical downlink shared channel (PDSCH) for the UE.

24. The communications device of claim 19, wherein the interference condition for control channel transmissions between the second base station and the UE served by the second base station is caused by proximity of the UE to the first base station.

25. A method of wireless communication performed by a user equipment (UE), comprising:
receiving downlink control channel signaling from a first base station, the downlink control channel signaling comprising an assignment of resources to the UE for a data transmission over a downlink channel from a second base station serving the UE, wherein the downlink control channel signaling is based on an exchange, by the first base station with the second base station, of information related to an interference condition for control channel transmissions between the second base station and the UE, wherein the exchange comprises sending control information corresponding to the assignment of resources to the UE for the data transmission from the second base station to the first base station; and
receiving the data transmission from the second base station in accordance with the downlink control channel signaling received from the first base station.

26. The method of claim 25, wherein a resource element allocation for the downlink control channel signaling is determined based upon a characteristic associated with the second base station.

27. The method of claim 26, wherein the characteristic comprises at least one of a cell ID of a second network cell associated with the second base station, a PCFICH configuration, or a PHICH configuration.

28. The method of claim 25, wherein the control information comprises one of control signaling, paging information, or SIB information.

29. The method of claim 25, wherein the receiving the downlink control channel signaling includes receiving the control information on a downlink channel comprising at least one of a PCFICH, PDCCH, or PHICH.

30. The method of claim 25, wherein the control information includes at least one of paging or SIB information associated with the second base station, the receiving the downlink control channel signaling including receiving the control information on a PDSCH.

31. The method of claim 30, wherein the control information further includes SIB information associated with the first base station, wherein the SIB information associated with the second base station is concatenated to the SIB information associated with the first base station.

32. The method of claim 25, wherein the control information identifies downlink channel resources of the downlink channel from the second base station for the data transmission based at least in part on a cell ID of a second network cell associated with the second base station.

33. The method of claim 25, wherein the first base station is in a first network cell and the second base station is in a second network cell.

34. The method of claim 33, wherein the first network cell is associated with a first cell ID and the second network cell is associated with a second, different cell ID.

35. The method of claim 25, wherein the downlink channel from the second base station comprises a physical downlink shared channel (PDSCH) for the UE.

36. The method of claim 25, wherein the interference condition for control channel transmissions between the UE and the second base station serving the UE is caused by proximity of the UE to the first base station.

37. A non-transitory computer-readable medium comprising code for causing a computer to:
receive downlink control channel signaling from a first base station, the downlink control channel signaling comprising an assignment of resources to the user equipment (UE) for a data transmission over a downlink channel from a second base station serving the UE, wherein the downlink control channel signaling is based on an exchange, by the first base station with the second base station, of information related to an interference condition for control channel transmissions between the second base station and the UE, wherein the exchange comprises sending control information corresponding to the assignment of resources to the UE for the data transmission from the second base station to the first base station; and
receive the data transmission from the second base station in accordance with the downlink control channel signaling received from the first base station.

38. A communications device for a user equipment (UE), comprising:
a memory; and
a processor coupled to the memory, and configured to
receive downlink control channel signaling from a first base station, the downlink control channel signaling comprising an assignment of resources to the UE for a data transmission over a downlink channel from a second base station serving the UE, wherein the downlink control channel signaling is based on an exchange, by the first base station with the second base station, of information related to an interference condition for control channel transmissions between the second base station and the UE, wherein the exchange comprises sending control information corresponding to the assignment of resources to the UE for the data transmission from the second base station to the first base station; and
receive the data transmission from the second base station in accordance with the downlink control channel signaling received from the first base station.

39. The communications device of claim 38, wherein the control information identifies downlink channel resources of the downlink channel from the second base station for the data transmission based at least in part on a cell ID of a second network cell associated with the second base station.

40. The communications device of claim 38, wherein the first base station is in a first network cell and the second base station is in a second network cell.

41. The communications device of claim 40, wherein the first network cell is associated with a first cell ID and the second network cell is associated with a second, different cell ID.

42. The communications device of claim 38, wherein the downlink channel from the second base station comprises a physical downlink shared channel (PDSCH) for the UE.

43. The communications device of claim 38, wherein the interference condition for control channel transmissions between the second base station and the UE is caused by proximity of the UE to the first base station.

44. A communications device for a user equipment (UE), comprising:
means for receiving downlink control channel signaling from a first base station, the downlink control channel signaling comprising an assignment of resources to the UE for a data transmission over a downlink channel from a second base station serving the UE, wherein the downlink control channel signaling is based on an exchange, by the first base station with the second base station, of information related to an interference condition for control channel transmissions between the second base station and the UE, wherein the exchange comprises sending control information corresponding to the assignment of resources to the UE for the data transmission from the second base station to the first base station; and
means for receiving the data transmission from the second base station in accordance with the downlink control channel signaling received from the first base station.

45. The communications device of claim 44, wherein the control information identifies downlink channel resources of the downlink channel from the second base station for the data transmission based at least in part on a cell ID of a second network cell associated with the second base station.

46. The communications device of claim 44, wherein the first base station is in a first network cell and the second base station is in a second network cell.

47. The communications device of claim 46, wherein the first network cell is associated with a first cell ID and the second network cell is associated with a second, different cell ID.

48. The communications device of claim 44, wherein the downlink channel from the second base station comprises a physical downlink shared channel (PDSCH) for the UE.

49. The communications device of claim 44, wherein the interference condition for control channel transmissions between the second base station and the UE is caused by proximity of the UE to the first base station.

* * * * *